(12) United States Patent
Sharma et al.

(10) Patent No.: US 10,444,982 B2
(45) Date of Patent: Oct. 15, 2019

(54) METHOD AND APPARATUS FOR PERFORMING OPERATION USING INTENSITY OF GESTURE IN ELECTRONIC DEVICE

(71) Applicant: Samsung Electronics Co., Ltd., Suwon-si, Gyeonggi-do (KR)

(72) Inventors: Ankur Sharma, Rajasthan (IN); Sachin Kumar Gupta, Aligarh (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 12 days.

(21) Appl. No.: 15/244,405

(22) Filed: Aug. 23, 2016

(65) Prior Publication Data
US 2017/0109033 A1 Apr. 20, 2017

(30) Foreign Application Priority Data

Oct. 16, 2015 (IN) .......................... 3341/DEL/2015

(51) Int. Cl.
| | |
|---|---|
| *G06F 3/0488* | (2013.01) |
| *G06F 3/0481* | (2013.01) |
| *G06F 3/0482* | (2013.01) |
| *H04L 29/08* | (2006.01) |

(52) U.S. Cl.
CPC ........ *G06F 3/04883* (2013.01); *G06F 3/0482* (2013.01); *G06F 3/04817* (2013.01); *H04L 67/10* (2013.01)

(58) Field of Classification Search
CPC ............. G06F 3/04883; G06F 3/04817; G06F 3/0482; H04L 67/10

USPC .......................................... 345/173; 715/863
See application file for complete search history.

(56) References Cited

U.S. PATENT DOCUMENTS

| | | | |
|---|---|---|---|
| 8,341,145 B2 | 12/2012 | Dodson et al. | |
| 8,411,060 B1 * | 4/2013 | Scholler | G06F 3/04883 345/173 |
| 8,582,828 B2 | 11/2013 | Panzer et al. | |
| 8,724,908 B2 | 5/2014 | Dale et al. | |
| 9,448,704 B1 * | 9/2016 | Belhumeur | G06F 3/04842 |
| 2010/0325218 A1 | 12/2010 | Castro et al. | |
| 2012/0242840 A1 | 9/2012 | Nakfour et al. | |
| 2013/0167062 A1 * | 6/2013 | Herring | G06F 3/04883 715/773 |
| 2013/0251201 A1 | 9/2013 | Zhou | |
| 2014/0011487 A1 | 1/2014 | Hwang et al. | |
| 2014/0137053 A1 * | 5/2014 | Zhang | G06F 3/04883 715/863 |
| 2014/0359516 A1 * | 12/2014 | O'Donoghue | G06F 3/0483 715/776 |
| 2015/0123921 A1 * | 5/2015 | Choi | G06F 3/0416 345/173 |
| 2015/0131872 A1 | 5/2015 | Ganong et al. | |

* cited by examiner

*Primary Examiner* — Nitin Patel
*Assistant Examiner* — Amy Onyekaba
(74) *Attorney, Agent, or Firm* — Jefferson IP Law, LLP

(57) ABSTRACT

The embodiments herein provide a method for performing an operation in an electronic device. The method includes displaying at least two objects. Further, the method includes identifying a gesture on the at least two objects. Further, the method includes displaying at least one content for performing at least one operation relative to the at least two objects according to a level corresponding to the gesture among a plurality of levels.

20 Claims, 46 Drawing Sheets

(1)

(2)

(3)

(4)

METHOD AND APPARATUS FOR PERFORMING OPERATION USING INTENSITY OF GESTURE IN ELECTRONIC DEVICE

CROSS-REFERENCE TO RELATED APPLICATION

The present application is related to and claims benefit under 35 U.S.C. § 119(a) to a Indian patent application filed on Oct. 16, 2015, and assigned Serial No. 3341/DEL/2015, the entire disclosure of which is hereby incorporated by reference.

TECHNICAL FIELD

The embodiments herein generally relate to electronic devices, and more specifically, to a method and apparatus for performing an operation based on a level of a gesture on at least two objects of interest displayed in an electronic device.

BACKGROUND

Portable electronic devices (such as gaming devices, smart phones, tablets, phablets, media players, digital assistants, electronic book reader devices, consumer electronic devices, or the like) are becoming increasingly popular. Such electronic devices generally include various images that act as a memory storehouse of a user. The users tend to share images as a tool for recalling past memories and hence, these images can also be treated as a source of information. The images include meaningful objects and information which can be used to perform meaningful operations. The meaningful operation can be defined as one which help the user to perform functionality in a more convenient and simple way.

The conventional systems and methods allow the user to interact with the images where a mode of input is a simple touch based selection. Existing image parsing techniques are utilized to identify the objects in the image and perform various operations. For example, the user is provided with an option to select an object (i.e., person) in the image and then establish a connection with the person through existing social network. However, the user has to transition among various applications to perform or trigger any such operation. Thus, there is a need of a robust and simple system and method for easily triggering or performing operations.

SUMMARY

The principal object of the embodiments herein is to provide a method for performing an operation based on a gesture performed on at least two objects displayed in an electronic device.

Another object of the embodiments herein is to provide a mechanism for detecting a gesture performed on at least two objects displayed on the electronic device.

Another object of the embodiments herein is to provide a mechanism for determining an intensity of the gesture.

Another object of the embodiments herein is to provide a mechanism for mapping the intensity of the gesture with at least one operation to be performed.

Another object of the embodiments herein is to provide a mechanism for performing an operation relative to the at least two objects based on the intensity of the gesture. Accordingly, the embodiments herein provide a method for performing an operation in an electronic device. The method includes displaying at least two objects. Further, the method includes identifying a gesture on the at least two objects. Further, the method includes displaying at least one content for performing at least one operation relative to the at least two objects according to a level corresponding to the gesture among a plurality of levels.

Accordingly, the embodiments herein provide an electronic device for performing an operation. The electronic device includes a display configured to display at least two objects. Further, the electronic device includes at least one processor configured to identify a gesture on at the least two objects displayed in the electronic device, and control the display to display at least one content for performing at least one operation relative to the at least two objects according to a level corresponding to the gesture among a plurality of levels.

Accordingly, the embodiments herein provide a computer program product including a computer executable program code recorded on a computer readable non-transitory storage medium. The computer executable program code when executed causing the operations including displaying at least two objects. Further, the computer executable program code when executed causing the operations including identifying a gesture on the at least two objects. Further, the computer executable program code when executed causing the operations including displaying at least one content for performing at least one operation relative to the at least two objects according to a level corresponding to the gesture among a plurality of levels.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

This invention is illustrated in the accompanying drawings, throughout which like reference letters indicate corresponding parts in the various figures. The embodiments herein will be better understood from the following description with reference to the drawings, in which.

DETAILED DESCRIPTION

Figure 1:
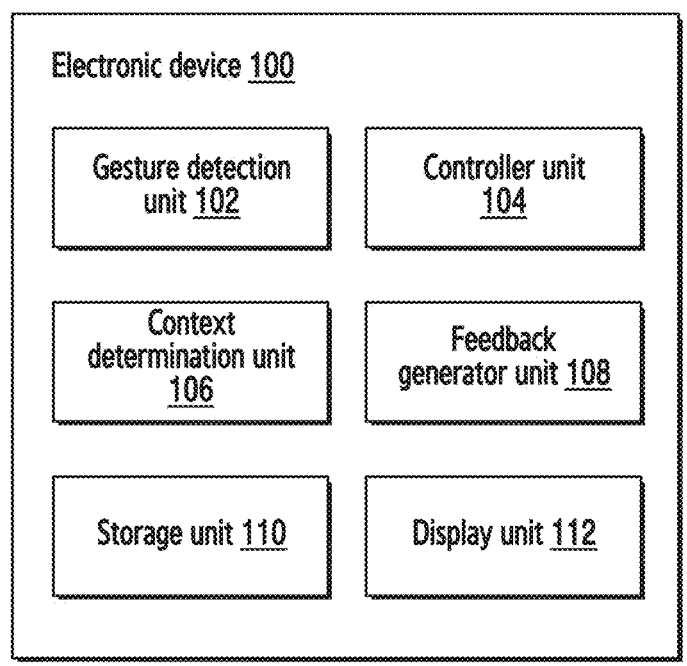
FIG. 1 illustrates a block diagram of an electronic device for performing an operation based on an intensity level of gesture performed on at least two objects, according to an embodiment as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

The embodiments herein disclose a method for performing an operation based on a level of a gesture performed on at least two objects. The method includes detecting a gesture performed on at least two objects displayed on the electronic device. Further, the method includes determining an intensity of the gesture; and performing operation(s) relative to the two objects based on the intensity of the gesture.

In an embodiment, the method includes simultaneously displaying an indicia corresponding to the intensity of the gesture. In an embodiment, the intensity indicates a type of operation to be performed on the two objects.

In an embodiment, the indicia seamlessly changes based on the intensity of the gesture. In an embodiment, the indicia can be an application icon, a numeral, a symbol, an alphabet, a feedback, or combination of same.

In an embodiment, the operation includes pairing the at least two objects, updating status in a Social Networking Site (SNS) relative to the at least two objects, sending a friend request in a SNS relative to the at least two objects, sending recommendation in a SNS relative to the at least two objects, scheduling a meeting relative to the at least two objects, initiating a call relative to the at least two objects, requesting a service relative to the at least two objects, modifying playback option relative to the at least two objects, sharing a data item relative to the at least two objects, displaying historic data relative to the at least two objects, or the like.

In an embodiment, the operation is dynamically determined based on at least one parameter associated with the item displayed on the screen of the electronic device.

Unlike the conventional systems and methods, the proposed method aims to improve the overall user convenience by providing options to perform meaningful operations over the images in simple and smooth ways. In the conventional systems and methods, the images are used to convey a static meaning such as sharing the memories and movements among the users; the proposed method provides options for the user to interact with the images in a way to produce meaningful operations to be performed.

Generally, the images contain meaningful objects and information which can be used to perform meaningful operations. The user is provided with the options to identify meaningful objects in the selected image. Various identification schemes can be employed to extract and parse the object information in the images. Unlike the conventional systems and methods, the proposed method can be used to provide options to the user for accessing the images and perform daily user activities by associating meaningful operations to the objects available in the image in a simple and robust way.

For example, while viewing the image, the user may perform a gesture on the user image object with respect to a friend image object to initiate a call in real-time. In another example, while viewing the image, the user may perform the gesture on the user image object with respect to the friend image object to update an emotional status of the user relative to the friend in a Social Networking Site (SNS). In another example, while viewing the image, the user may perform the gesture on the user image object with respect to the friend image object to send a friend request in the SNS.

Further, in order to identify the meaningful operation, the intensity level associated with the gesture performed by the user is determined. The intensity levels can be mapped to the type of operation to be performed as per the desired usage over the identified meaningful object in the image. For example, the intensity level can be mapped with the emotional level to update the same over the SNS. The user may use the intensity level to select the type of emotion to be updated in the SNS.

Referring now to the drawings, and more particularly to FIGS. 1 through 15, where similar reference characters denote corresponding features consistently throughout the figures, there are shown preferred embodiments.

FIG. 1 illustrates a block diagram of an electronic device 100 for performing an operation based on an intensity level of gesture performed on at least two objects, according to embodiments as disclosed herein. The electronic device 100 can be, for example, a laptop, a desktop computer, a mobile phone, a smart phone, Personal Digital Assistants (PDAs), a tablet, a phablet, a consumer electronic device, a server, or any other electronic device. In an embodiment, the electronic device 100 includes a gesture detection unit 102, a controller unit 104, a context determination unit 106, a feedback generator unit 108, a storage unit 110, and a display unit 112.

The gesture detection unit 102 can be configured to detect a gesture performed on two objects displayed on the electronic device 100. The object can be, for example, but not limited to, a face in an image, a clipart, image objects, objects on a map, a face in video frame, a pairing object, security, or the like. The objects are displayed on a User Interface (UI) of the electronic device 100 which can be interacted by the user on performing the gesture.

Further, the gesture detection unit 102 can be configured to recognize and identify inputs provided by user on a screen of the electronic device 100. In an embodiment, the gesture detection unit 102 can be configured to be included or coupled to the screen with an Integrated Circuit (IC) to recognize and identify the inputs (i.e., touch coordinates) from the user and display corresponding output in the form of the UI design. The gesture detection unit 102 can be configured to provide identified touch coordinates used by the user for performing the gesture to the controller unit 104. After receiving the touch coordinates, the controller unit 104 can be configured to determine the type of gesture performed by the user. In an embodiment, the mechanism for determining the type of gesture is described below:

Initially, the starting touch coordinates $P1(x1, y1)$ and $P2(x2, y2)$ are determined.

As the user performs the gesture motion, new touch coordinates P1_New and P2_New are determined.

The relative difference between (P1, P1_New) and (P2, P2_New) is determined. Based on the relative difference, the type of gesture (i.e., whether it is "JOIN" or "AWAY" gesture) is determined. In an example, if the relative difference is less then, the type of gesture can be determined as a "JOIN" gesture. In other example, if the relative difference is more then, the type of gesture can be determined as an "AWAY" gesture. An example of such "JOIN" gesture and "AWAY" gesture are described in conjunction with the FIGS. 2A and 2B.

After receiving the gesture, the controller unit 104 can be configured to determine the intensity of the gesture performed by the user. The mechanism for determining the intensity of the gesture is described below:

Here, the intensity of the gesture is function of both the relative distance between P1 and P2 and the calculated speed of the gesture motion.

D' is the relative distance between P1 and P2 at any time instant.

If the user performs the gesture motion from P1 to P1_New in time (t') then, the relative speed for the gesture motion for P1 is S'. Similarly, when the user performs the gesture motion from P2 to P2_New in time (t") then, the relative speed for the gesture motion for P2 is S".

The intensity of the gesture is the function of D', S', and S" together and Equation 1 is shown below:

$$\text{Intensity}(I) = f(D', S', S'') \quad \text{Equation 1}$$

The controller unit 104 associates the determined intensity level of the gesture with the objects in the image on which the gesture is performed. The intensity level is mapped to the meaningful operations through intensity mapping table. Further, the intensity is then passed onto the feedback generator unit 108. In an embodiment, the user is displayed with an indicia corresponding to the intensity of the gesture. The indicia is an application icon, a numeral, a symbol, an alphabet, a feedback, or combination of same. The indicia seamlessly changes based on the intensity of the gesture.

In an embodiment, the intensity indicates the type of operation to be performed on the at least two objects. The operation includes pairing the at least two objects, updating status in a Social Networking Site (SNS) relative to the at least two objects, sending a friend request in a SNS relative to the at least two objects, sending recommendation in a SNS relative to the at least two objects, scheduling a meeting relative to the at least two objects, initiating a call relative to the at least two objects, requesting a service relative to the at least two objects, modifying playback option relative to the at least two objects, sharing a data item relative to the at least two objects, displaying historic data relative to the at least two objects, or the like. The operation is dynamically determined based on at least one parameter associated with the item displayed on the screen of the electronic device 100.

Further, the controller unit 104 can be configured to determine the current context in which the gesture is performed using the context determination unit 106. The context determination unit 106 can be configured to determine the active context in which the respective gestures are being performed. Further, the context determination unit 106 can be configured to interact with the Operating System (OS) directly to extract information like current active process, activity, running applications, tasks, or the like. Also, it identifies the relevant database corresponding to the determined context. Further, the context determination unit 106 can be configured to forward the information of the level of intensity (I), gesture (G), location of object-1, and location of object-2 to the controller unit 104.

After receiving the information, the controller unit 104 can be configured to identify objects based on the touch coordinates and accessible database. Further, the controller unit 104 can be configured to establish rule based meaning to the identified objects relevant to the active context. The controller unit 104 can be configured to perform the operation relative to the two objects based on the intensity and context of the gesture.

The feedback generator unit 108 receives the active context and the intensity level of the gesture from the controller unit 104. After receiving the information, the feedback generator unit 108 determines a type of feedback to be provided to the user based on the active context. In an embodiment, the type of feedback is a haptic feedback, a vibration feedback, a background display brightness feedback, a background sound feedback, an image object specific glow feedback, or the like. In an embodiment, it's possible to integrate more than one type of feedback to the user. Unlike the conventional systems and methods, as the gestures are mapped with the level of intensity and a meaning, the user is provided with a more relevant understanding of the context by providing the feedback.

The storage unit 110 may include one or more computer-readable storage media. The storage unit 110 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the storage unit 110 may, in some examples, be considered a non-transitory storage medium. The term "non-transitory" may indicate that the storage medium is not embodied in a carrier wave or a propagated signal. However, the term "non-transitory" should not be interpreted to mean that the storage unit 110 is non-movable. In some examples, the storage unit 108 is configured to store larger amounts of information than the memory. In certain examples, a non-transitory storage medium may store data that can, over time, change (e.g., in Random Access Memory (RAM) or cache).

Further, the storage unit 110 can be configured to store the mapping table including the level of intensity and the type of operation to be performed. An example mapping table, where the intensity level mapped with the type of operation to be performed is shown below:

TABLE 1

| Intensity Level | Function "Type of Operation" |
|---|---|
| 1 | Latest "Provide latest content to the user i.e., 1 week old, current or future" |
| 2 | Older "Provide the content to the user i.e., 4 weeks old" |
| 3 | Complete "Provide entire available content to the user" |

The display unit 112 displays the image selected by the user on the screen of the electronic device 100.

The FIG. 1 shows a limited overview of the electronic device 100 but, it is to be understood that another embodiment is not limited thereto. Further, the electronic device 100 can include different units communicating among each other along with other hardware or software components. By way of illustration, both an application running on an electronic device 100 and the electronic device 100 can be the component.

Figure 2A:
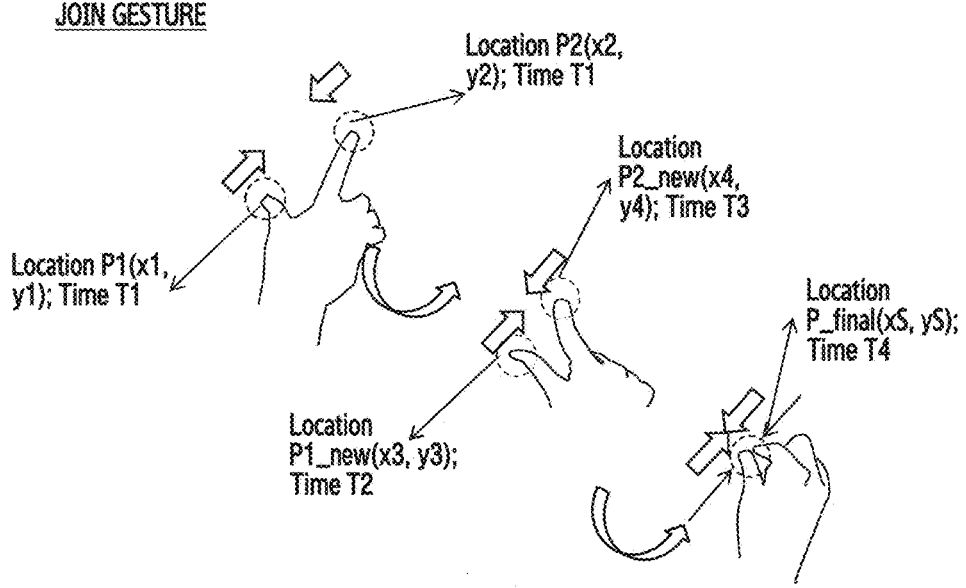
FIG. 2A illustrates an example "JOIN" gesture performed on at least two objects displayed on an electronic device, according to an embodiment as disclosed herein.

FIG. 2A illustrates an example "JOIN" gesture performed on at least two objects displayed on the electronic device 100, according to an embodiment as disclosed herein. As shown in the FIG. 2A, the user may perform the "JOIN" gesture on the image objects. By performing the "JOIN" gesture, the user can express the intent to perform the operation which conveys the meaning of connecting or attaching operation. In an embodiment, the gesture can also be used to convey a positive or affirmative intent depending upon the context.

Further, the "JOIN" gesture is performed over the image objects to convey the intensity level. The intensity of the gesture is appropriately mapped with the meaningful operation over the image objects.

Figure 2B:
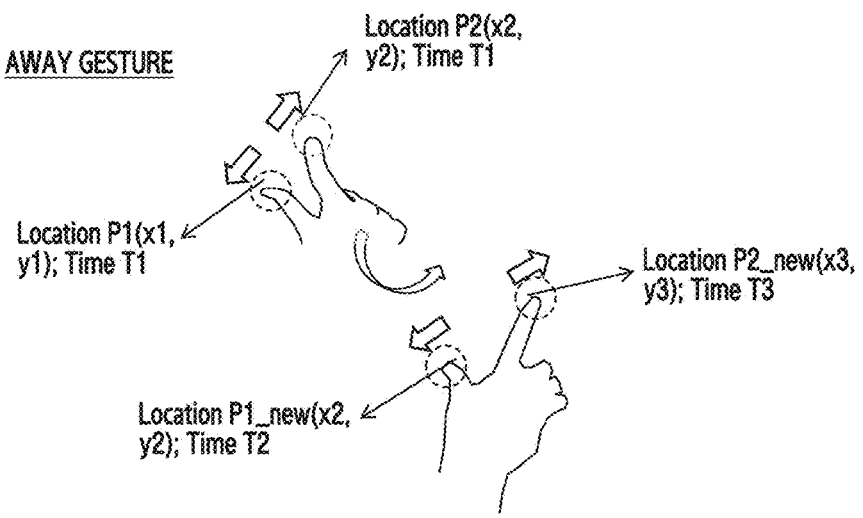
FIG. 2B illustrates an example "AWAY" gesture performed on at least two objects displayed on an electronic device, according to an embodiment as disclosed herein.

FIG. 2B illustrates an example "AWAY" gesture performed on at least two objects displayed on the electronic device 100, according to an embodiment as disclosed herein. As shown in the FIG. 2B, the user may perform the "AWAY" gesture on the image objects. By performing "AWAY" gesture, the user can express the intent to perform the operation which conveys the meaning of separating or detaching operation. In an embodiment, the gesture can also convey a negative or dissent intent depending upon the context.

Further, the "AWAY" gesture is performed over the image objects to convey the intensity level. The intensity is appropriately mapped with the meaningful operation over the objects.

In an embodiment, user habit is one of the user operations. The user habit depends on the speed leaning (i.e., velocity function and pressure function) and length of swipe (intended operation and actual operation) performed by the user.

Though the FIGS. 2A and 2B show a specific type of gesture such as the "JOIN" gesture and the "AWAY" gesture but, it is to be understood that other type of gestures are not limited thereon. Unlike conventional systems and methods, any other direction or intensity based gesture can be used to determine the intensity level in order to determine the meaningful operation.

Figure 3:
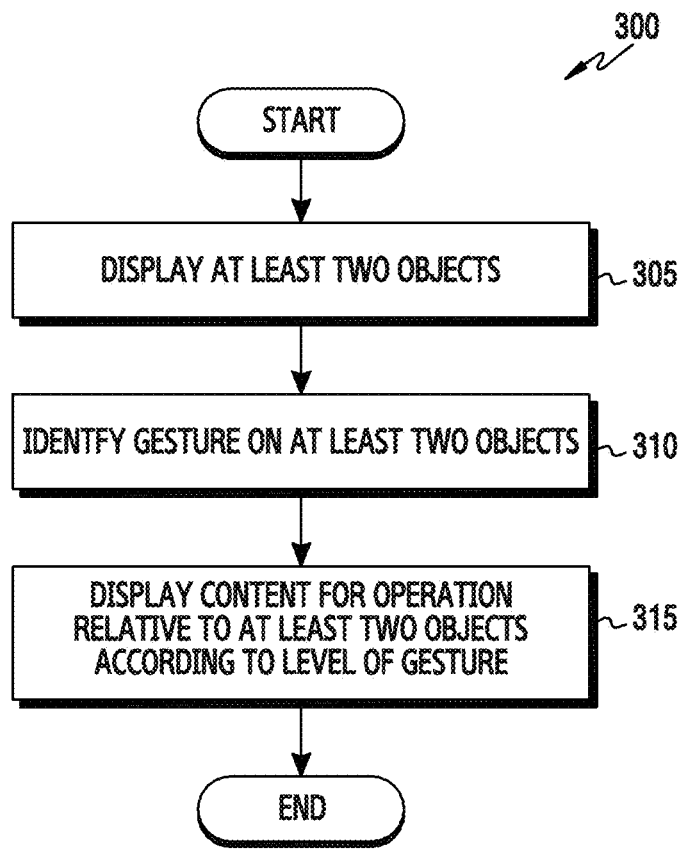
FIG. 3 is a flow diagram illustrating a method for performing an operation based on an intensity level of a gesture performed on at least two objects, according to an embodiment as disclosed herein.

FIG. 3 is a flow diagram illustrating a method 300 for performing the operation based on the intensity level of the gesture performed on at least two objects, according to embodiments as disclosed herein. In embodiment, at step 305, the display unit 112 of the electronic device 100 displays the at least two objects on the electronic device 100. The controller unit 104 may control the display unit 112 to display the at least two objects. The objects can be, for example but not limited to the, face in the image, clipart, image objects, objects on the map, face in video frame, pairing object, security, or the like.

At step 310, the method 300 includes identifying a gesture on the at least two objects. The controller unit 104 may identify the gesture on the at least two objects. The controller unit 104 may identify the gesture detected by the gesture detection unit 102. In an embodiment, the gesture can be similar or substantially similar to the "JOIN" gesture as shown in FIG. 2A. In another embodiment, the gesture can be similar or substantially similar to the "AWAY" gesture as shown in FIG. 2B.

At step 315, the method 300 includes displaying at least one content for at least one operation relative to the at least two objects according to a level corresponding to the gesture among a plurality of levels. Each of the plurality of levels corresponds to a predefined type of an operation relative to the at least two objects. The level of the gesture may be determined based on a distance between at least two touch points by the gesture and a movement speed of each of at least two touch points. The display unit 112 displays the at least one content for the at least one operation relative to the at least two objects according to the level of the gesture. The controller unit 104 may control the display unit 112 to display the at least one content for the at least one operation relative to the at least two objects according to the level of the gesture. In an embodiment, the display unit 112 may display an indicator corresponding to the level of the gesture. The indicator may change based on the level of the gesture. The indicator may be an application icon, a numeral, a symbol, an alphabet, a feedback, or the like. In an embodiment, the controller 104 generates a feedback in response to the at least one operation. The feedback can be a haptic feedback, a vibration feedback, a background display brightness feedback, a background sound feedback, an image object specific glow feedback, or the like. The level of the gesture may indicate a type of the at least one operation to be performed relative to the two objects.

In an embodiment, the at least one operation includes at least one of pairing the at least two objects, updating status in the SNS relative to the at least two objects, sending the friend request in the SNS relative to the at least two objects, sending recommendation in the SNS relative to the at least two objects, scheduling the meeting relative to the at least two objects, initiating the call relative to the at least two objects, requesting the service relative to the at least two objects, modifying playback option relative to the at least two objects, sharing the data item relative to the at least two objects, displaying historic data relative to the at least two objects, or the like. The at least one operation is dynamically determined based on at least one parameter associated with the item displayed on the screen of the electronic device 100.

The various operations, acts, blocks, steps, or the like in the method 300 may be performed in the order presented, in a different order or simultaneously. Further, in some embodiments, some of the operations, acts, blocks, steps, or the like may be omitted, added, modified, skipped, or the like without departing from the scope of the invention.

Figure 4A:
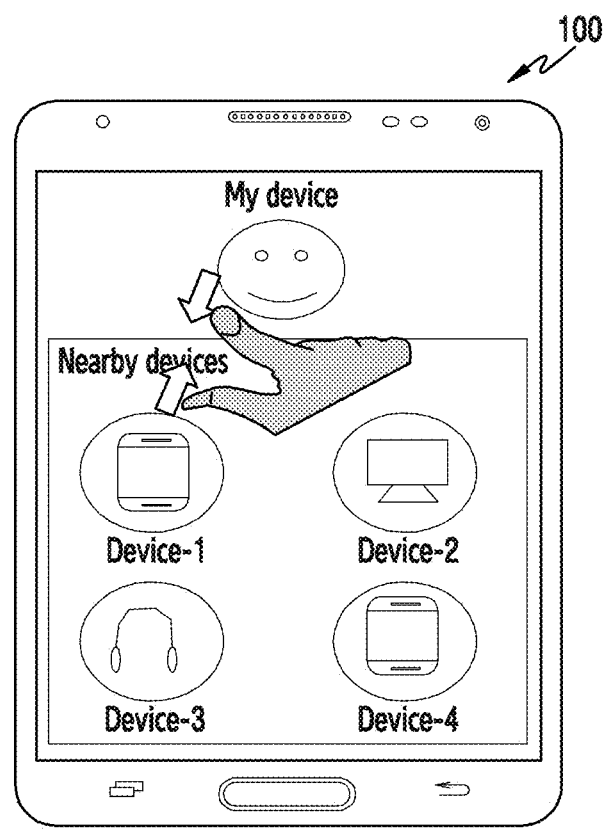
FIG. 4A shows an example illustration in which a gesture is performed on two devices displayed on a screen of an electronic device, according to an embodiment as disclosed herein.

FIG. 4A shows an example illustration in which the gesture is performed on two devices displayed on the screen of the electronic device 100, according to an embodiment as disclosed herein. In an embodiment, consider a paring scenario where a user decides to pair "My Device" object with "Device-1" object. The security level that the user would like to select while pairing the devices is "access level 4" in which the devices are configured with only read and write permission. For the purpose of explaining the paring scenario, consider an example intensity mapping table (i.e., Table 2) that includes information related to the various access levels and corresponding intensity level as described below:

TABLE 2

| Intensity Level | Type of operation |
|---|---|
| 5 | Access Level-5 "Read, Write, Execute" |
| 4 | Access Level-4 "Read, Write" |
| 3 | Access Level-3 "Read" |

TABLE 2-continued

| Intensity Level | Type of operation |
| --- | --- |
| 2 | Access Level-2 "Permission based Read" |
| 1 | Access Level-1 "Permission Required" |

The user may select and enable a Bluetooth option by accessing settings menu available on a home screen of the electronic device 100. After enabling the Bluetooth option, the nearby devices which are in proximate to the electronic device 100 are displayed to the user; on the screen of the electronic device 100.

As shown in the FIG. 4A, the user performs the gesture on the "My device" and "Device-1". After detecting the gesture, the gesture detection unit 102 identifies the starting touch coordinates. Further, if the user continues to perform the gesture motion on the objects, the gesture detection unit 102 identifies the new touch coordinates. The identified starting and new touch coordinates are sent to the controller unit 104.

After receiving the touch coordinates, the controller unit 104 determines the relative difference using the touch coordinates. Based on the determined relative difference, the controller unit 104 determines the type of gesture performed by the user to be the "JOIN" gesture. Further, the intensity of the "JOIN" gesture can be determined by the controller unit 104 and simultaneously display the intensity level to the user as shown in the FIG. 4B. In an embodiment, as the user performs the "JOIN" gesture motion, new coordinates are determined and accordingly the change in intensity level of the gesture is calculated and displayed to the user.

Figure 4B:
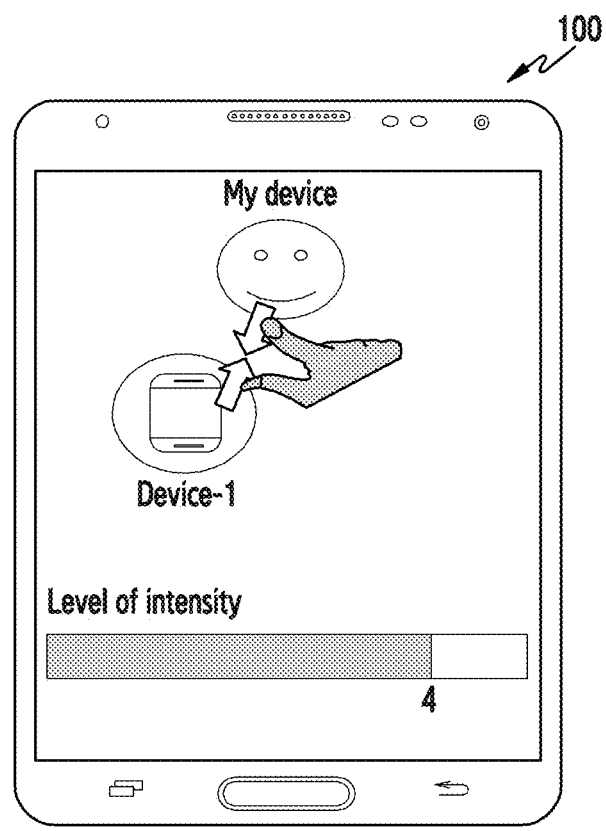
FIG. 4B shows an example illustration thereof in which an intensity level is displayed while the gesture is being performed on the two devices.

FIG. 4B shows an example illustration thereof in which the intensity level is displayed while the gesture is being performed on two devices. While performing the gesture, the corresponding intensity level associated with the gesture is displayed substantially at the same time on the screen of the electronic device 100. As shown in the FIG. 4B, as the user is intended to pair and enable the device with access level 4, the user stops the motion of the "JOIN" gesture when the intensity level "4" is displayed on the screen. Based on the Table 2, the controller unit 104 maps the intensity level to the type of operation and determines that the type of operation to be performed at "intensity level 4" is "access level 4" which allows "Only read and write permission" to the devices".

Based on the type of operations being determined, the controller unit 104 performs the pairing operation between the "My device" and "Device-1" in which the devices are paired and configured with the "access level 4" enabling the devices with "only read and write permission".

Figure 4C:
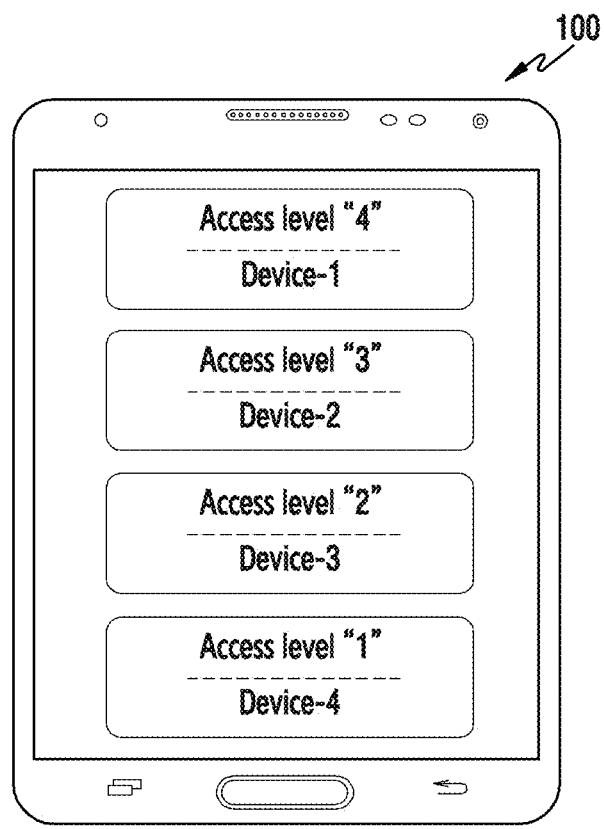
FIG. 4C shows an example illustration thereof in which access levels of all paired devices are displayed on the screen of the electronic device.

In an embodiment, the user can verify the access level of the paired devices as shown in the FIG. 4C. The FIG. 4C shows an example illustration thereof in which access levels of paired devices are displayed on the screen of the electronic device 100.

Similarly, in another example scenario, the user can change a previously configured access level of "Device-2". The user selects "Device-2" and initiates performing the gesture on the "My device" and the "Device-2". After detecting the gesture, the gesture detection unit 102 identifies the starting touch coordinates. Further, if the user continues to perform the gesture motion on the objects, the gesture detection unit 102 identifies the new touch coordinates. The identified starting and new touch coordinates are sent to the controller unit 104.

After receiving the touch coordinates, the controller unit 104 determines the relative difference using the touch coordinates. Based on the determined relative difference, the controller unit 104 determines type of gesture performed by the user to be the "AWAY" gesture. Further, the intensity of the "AWAY" gesture can be determined by the controller unit 104 and simultaneously display the intensity level to the user. In an embodiment, as the user performs the "AWAY" gesture motion, new coordinates are determined and accordingly the change in intensity level of the gesture is calculated and displayed to the user.

While performing the gesture, the corresponding intensity level associated with the gesture is displayed substantially at the same time on the screen of the electronic device 100. As the user intends to pair and enable the device with "access level 4", the user stops the motion of the "JOIN" gesture at the "intensity level 4".

Based on the Table 2, the controller unit 104 maps the intensity level to the type of operation and determines that the type to be performed at the "intensity level 2" is "access level 2" which allows "only permission based read" to the devices. Based on the type of operations determined, the controller unit 104 performs the pairing operation between the "My device" and the Device-2" in which the devices are paired and configured with the "access level 2" enabling the devices with only permission based read.

Similarly, the user can configure and reconfigure various access levels to the devices by performing the gestures on the devices. Unlike the conventional systems and methods, in which the user has to undergo a series of operations to pair and configure the devices in desired access level, the proposed method provides a robust and simple mechanism to pair and configure operations based on the gesture performed on the devices displayed on the electronic device 100.

Figure 5A:
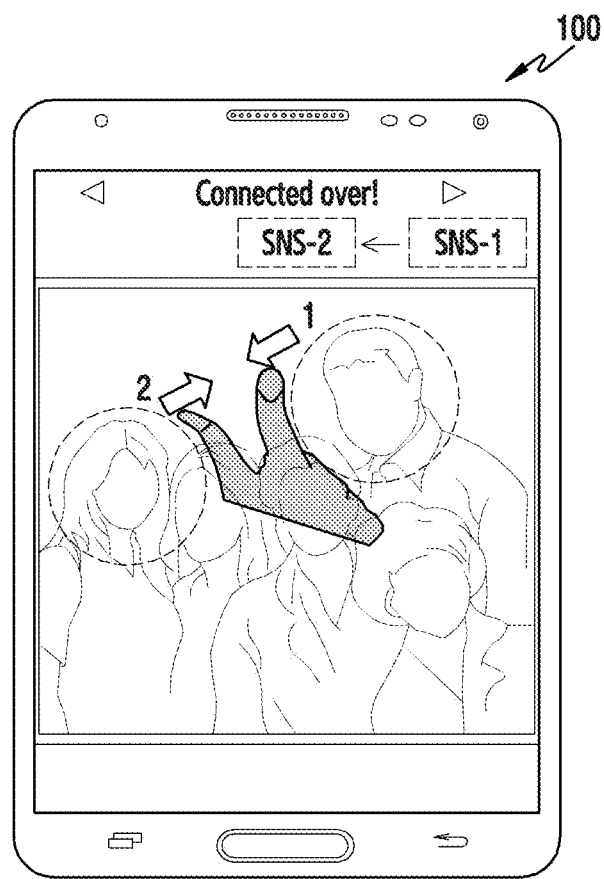
FIG. 5A shows an example illustration in which a gesture is performed on user image object and a friend image object displayed on a screen of an electronic device, according to an embodiment as disclosed herein.

FIG. 5A shows an example illustration in which the gesture is performed on a user image object and a friend image object displayed on the screen of the electronic device 100, according to an embodiment as disclosed herein. In an embodiment, consider a scenario where the user decides to update the emotional status on the SNS relative to the friend image object. For the purpose of explaining the scenario for updating the emotional status, consider an example intensity mapping (i.e., Table 3) that includes information related to the intensity level as described below:

TABLE 3

| Intensity Level | Emotional status update |
| --- | --- |
| 1 | Peaceful |
| 2 | Relieved |
| 3 | Missing |
| 4 | Loved |
| 5 | Hyper |

For the purpose of explaining the scenario for updating the emotional status, consider another example intensity mapping (i.e., Table 4) that includes information related to the intensity level as described below:

TABLE 4

| Intensity Level | Emotional status update |
| --- | --- |
| 1 | Disappointed |
| 2 | Upset |
| 3 | Angry |

TABLE 4-continued

| Intensity Level | Emotional status update |
| --- | --- |
| 4 | Annoyed |
| 5 | Broken |

As shown in the FIG. 5A, the user selects the friend image object (i.e., denoted by numeral "2"). The user performs the gesture on the user image object (i.e., denoted by numeral "1") and the friend image object to determine in which SNS, the emotional status is to be updated. The various SNS over which the friend is connected with the user are scrolled and displayed. Further, the user keeps holding the user image object and the friend image object to select the appropriate SNS over which the emotional status is to be updated.

The user selects the SNS-1 as the SNS-1 option scrolls and is displayed on the screen of the electronic device 100. The user lifts any one of his finger for selecting the SNS-1 to update the emotional status. The user performs the gesture on the image objects and the gesture detection unit 102 identifies the starting touch coordinates. Further, if the user continues to perform the gesture motion on the image objects, the gesture detection unit 102 identifies the new touch coordinates. The identified starting and new touch coordinates are sent to the controller unit 104.

After receiving the touch coordinates, the controller unit 104 determines the relative difference using the touch coordinates. Based on the determined relative difference, the controller unit 104 determines the type of gesture performed by the user to be the "JOIN" gesture. Further, the intensity of the "JOIN" gesture can be determined by the controller unit 104 and simultaneously display the intensity level to the user as shown in the FIG. 5B. At the same time, the feedback generator unit 108 provides the feedback to the user based on the intensity level.

Figure 5B:
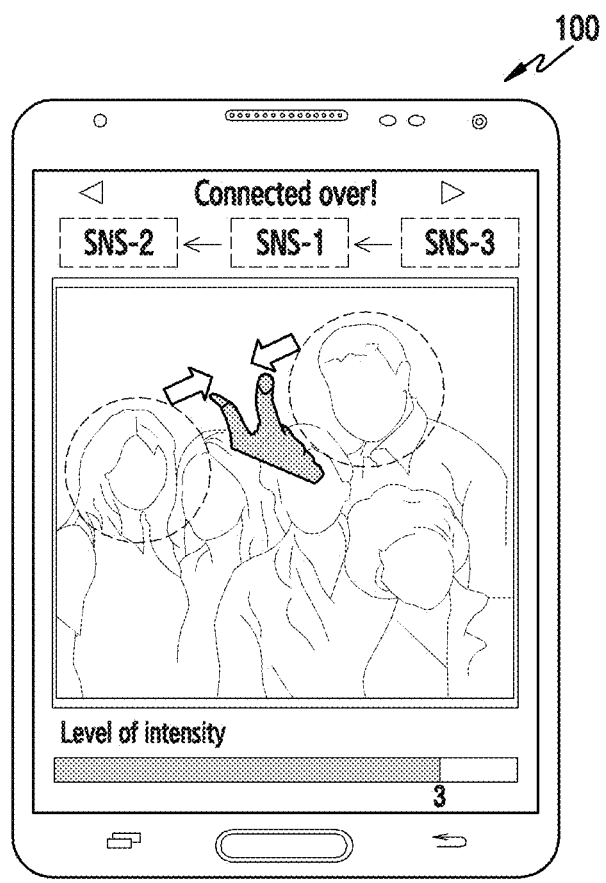
FIG. 5B shows an example illustration thereof in which an intensity level is displayed while the gesture being performed by a user.

FIG. 5B shows an example illustration thereof in which the intensity level is displayed while the gesture being performed by the user. While performing the gesture, the corresponding intensity level associated with the gesture is displayed substantially at the same time on the screen of the electronic device 100. As shown in the FIG. 5B, as the user intends to stop the motion of the "JOIN" gesture when the "intensity level 3" is displayed on the screen. As the intensity level increases, the feedback generator unit 108 provides higher feedback to the user. Based on the Table 3, the controller unit 104 maps the intensity level to the type of operation and determines that the type of operation to be performed at the "intensity level 3" is to update the emotional status as "Missing".

Figure 5C:
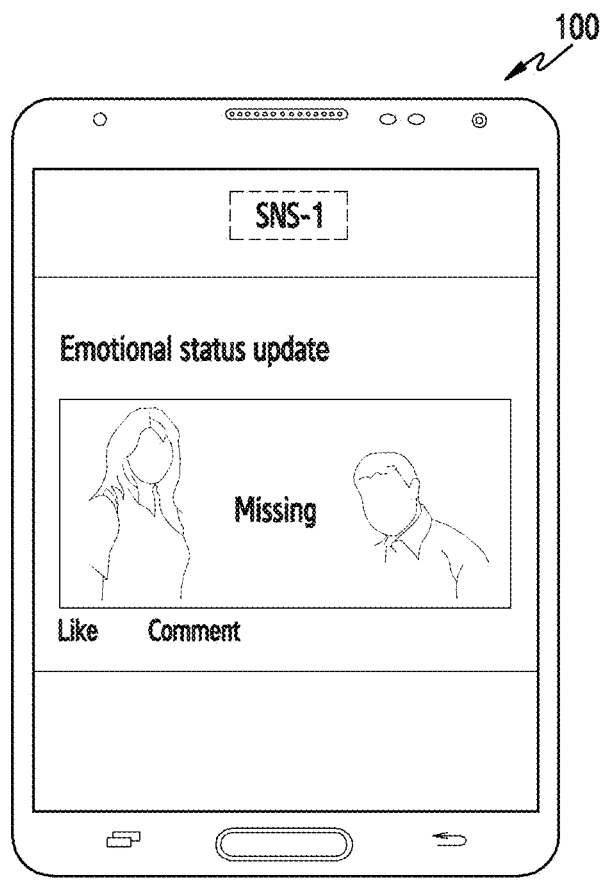
FIG. 5C shows an example illustration thereof in which a status update operation is performed based on the intensity level of the gesture.

Based on the type of operations being determined, the controller unit 104 updates the emotional status in the user's SNS-1 as shown in the FIG. 5C. The FIG. 5C shows an example illustration thereof in which the status update is performed based on the intensity level of the gesture.

Similarly, in another scenario, the user initiates performing the gesture and the gesture detection unit 102 identifies the starting touch coordinates. Further, if the user continues to perform the gesture on the image objects, the gesture detection unit 102 identifies the new touch coordinates. The identified starting and new touch coordinates are sent to the controller unit 104. After receiving the touch coordinates, the controller unit 104 determines the relative difference using the touch coordinates. Based on the determined relative difference, the controller unit 104 determines type of gesture performed to be the "AWAY" gesture. Further, the intensity level of the "AWAY" gesture can be determined by the controller unit 104 and simultaneously display the intensity level. At the same time, the feedback generator unit 108 provides the feedback to the user based on the intensity level.

Figure 5D:
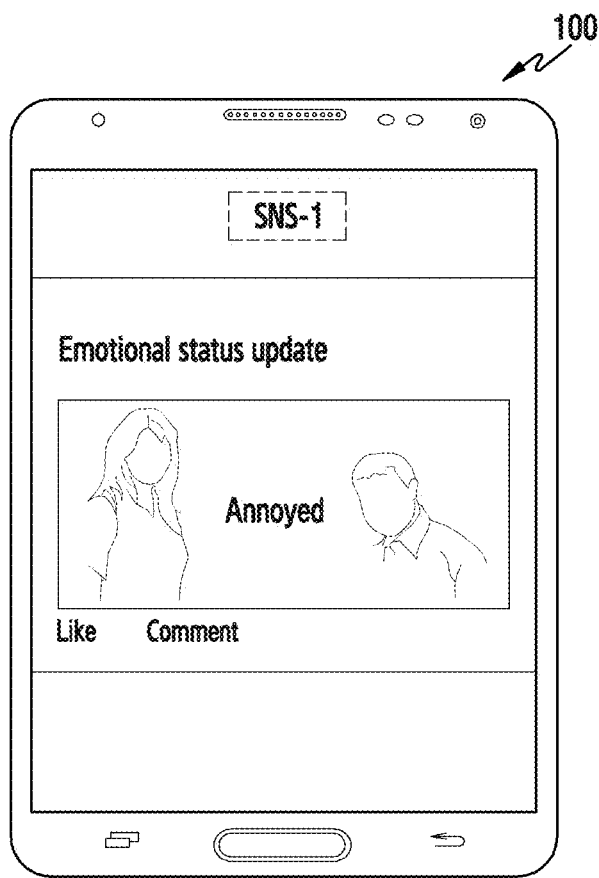
FIG. 5D shows another example illustration thereof in which a status update operation is performed based on the intensity level of the gesture.

While performing the gesture, the corresponding intensity level associated with the gesture is displayed substantially at the same time on the screen of the electronic device 100. As the user intends to stop the motion of the "AWAY" gesture when the "intensity level 4" is displayed on the screen. As the intensity level increases, the feedback generator unit 108 provides higher feedback to the user. Based on the Table 4, the controller unit 104 maps the intensity level to the type of operation and determines that the type of operation to be performed at the "intensity level 4" is to update the emotional status as "Annoyed". Based on the type of operations being determined, the controller unit 104 updates the emotional status in the user's SNS-1 as shown in the FIG. 5D. The FIG. 5D shows another example illustration thereof in which the status update is performed based on the intensity level of the gesture.

Figure 6A:
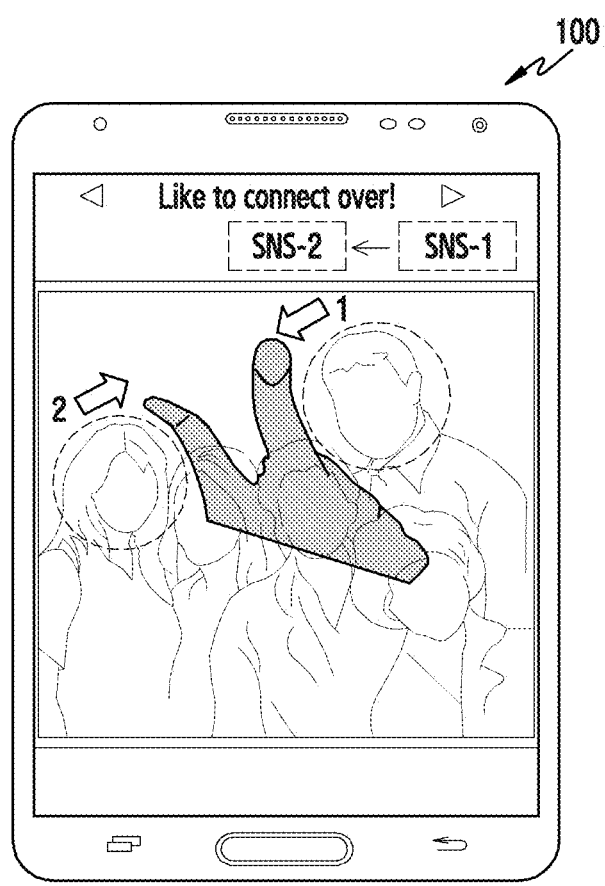
FIG. 6A shows an example illustration in which a gesture is performed on a user image object and a friend image object displayed on a screen of an electronic device, according to an embodiment as disclosed herein.

FIG. 6A shows an example illustration in which the gesture is performed on the user image object and the friend image object displayed on the screen of the electronic device 100, according to an embodiment as disclosed herein. In an embodiment, consider a scenario where the user decides to send the connection request to the friend image object over the SNS. For the purpose of explaining the scenario for sending the connection request, consider an example intensity level mapping table (i.e., Table 5) that includes information related to the various intensity level as described below:

TABLE 5

| Intensity Level | Emotional status update |
| --- | --- |
| 1 | Love |
| 2 | Family |
| 3 | Friends |
| 4 | Colleague |
| 5 | Acquaintance |

As shown in the FIG. 6A, the user selects the friend image object (i.e., denoted by numeral "2"). The user performs the gesture on the user image object (i.e., denoted by numeral "1") and the friend image object to determine over which SNS the connection request is to be sent. The various SNS over which the friend is connected with the user are scrolled and displayed. Further, the user keeps holding the user image object and the friend image object to select the appropriate SNS over which the connection request is to be sent.

The user selects the SNS-1 option as the option scrolls and is displayed on the screen. The user lifts any one of his finger for selecting the SNS-1 to send the connection request. The user performs the gesture on the image objects; and the gesture detection unit 102 identifies the starting touch coordinates. Further, if the user continues to perform the gesture on the image objects, the gesture detection unit 102 identifies the new touch coordinates. The identified starting and new touch coordinates are sent to the controller unit 104.

After receiving the touch coordinates, the controller unit 104 determines the relative difference using the touch coordinates. Based on the determined relative difference, the controller unit 104 determines the type of gesture performed by the user to be the "JOIN" gesture. Further, the intensity level of the "JOIN" gesture can be determined by the controller unit 104 and simultaneously display the intensity level to the user as shown in the FIG. 6B. At the same time, the feedback generator unit 108 provides the feedback to the user based on the intensity level.

Figure 6B:
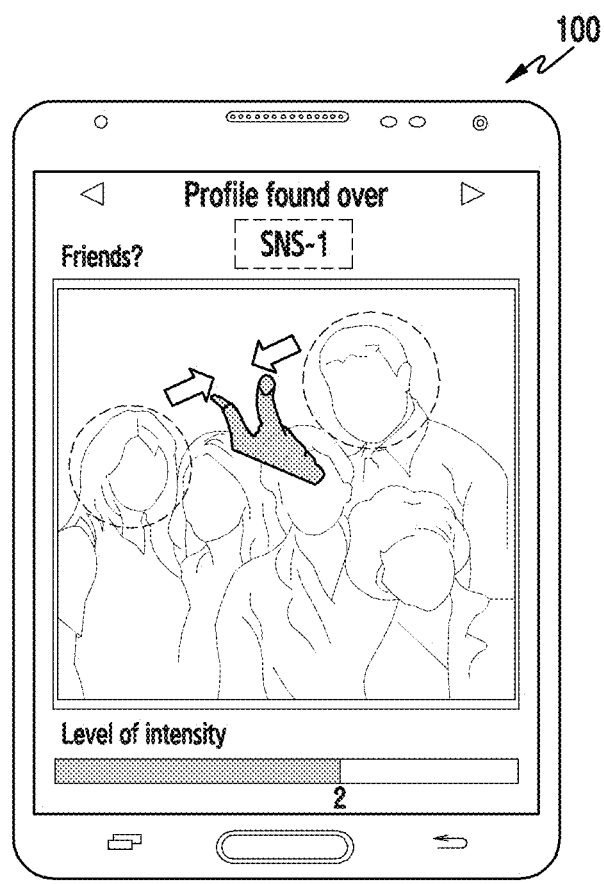
FIG. 6B shows an example illustration thereof in which an intensity level is displayed while the gesture is being performed by a user.

FIG. 6B shows an example illustration thereof in which the intensity level is displayed while the gesture is being performed by the user. While performing the gesture, the corresponding intensity level associated with the gesture is displayed substantially at the same time on the screen of the electronic device 100. As shown in the FIG. 6B, as the user intends to stop the motion of the "JOIN" gesture when the "intensity level 3" is displayed on the screen. As the intensity level increases, the feedback generator unit 108 provides higher feedback to the user. Based on the Table 5, the controller unit 104 maps the intensity level to the type of operation and determines that the type of operation to be performed at the "intensity level 3" is to send the connection request over SNS-1.

Figure 6C:
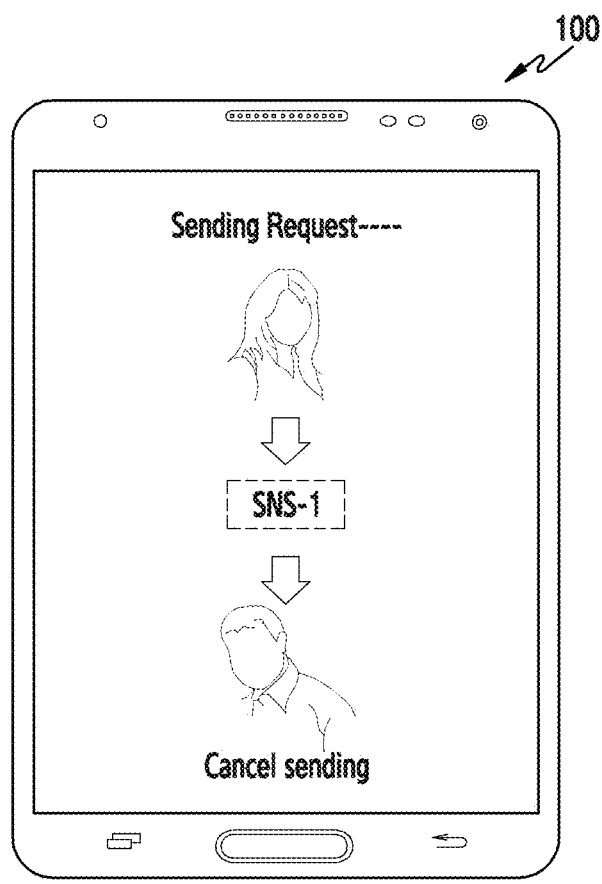
FIG. 6C shows an example illustration thereof in which a connection request is sent based on the intensity level of the gesture.

Based on the type of operation being determined, the controller unit 104 sends the connection request to the friend image object over SNS-1 as shown in the FIG. 6C. The FIG. 6C shows an example illustration thereof in which the connection request is sent based on the intensity level of the gesture.

In another embodiment, consider a scenario where the user decides to send the recommendation request over SNS relative to the friend image objects. For the purpose of explaining the scenario for sending the recommendation request, consider an example intensity level mapping table (i.e., Table 6) that includes information related to the various intensity level as described below:

TABLE 6

| Intensity Level | Function "Type of operation to be performed" |
|---|---|
| 1 | Random "A random just like that type recommendation" |
| 2 | Checkout "Recommending for a try at least to connect and communicate" |
| 3 | Highly recommended "Recommending to connect and communicate with utmost importance" |

The user performs the "JOIN" gesture on the two friends' image objects, where the two selected friends are in connection with the user over SNS-1 but the two selected friends are not connected to each other over SNS-1. The user performs the gesture on the two friend image objects; and the gesture detection unit 102 identifies the starting touch coordinates. Further, if the user continues to perform the gesture on the image objects, the gesture detection unit 102 identifies the new touch coordinates. The identified starting and new touch coordinates are sent to the controller unit 104.

After receiving the touch coordinates, the controller unit 104 determines the relative difference using the touch coordinates. Based on the determined relative difference, the controller unit 104 determines type of gesture performed by the user to be the "JOIN" gesture. Further, the intensity level of the "JOIN" gesture can be determined by the controller unit 104 and simultaneously display the intensity level to the user as shown in the FIG. 6B. At the same time, the feedback generator unit 108 provides the feedback to the user based on the intensity level.

Figure 6D:
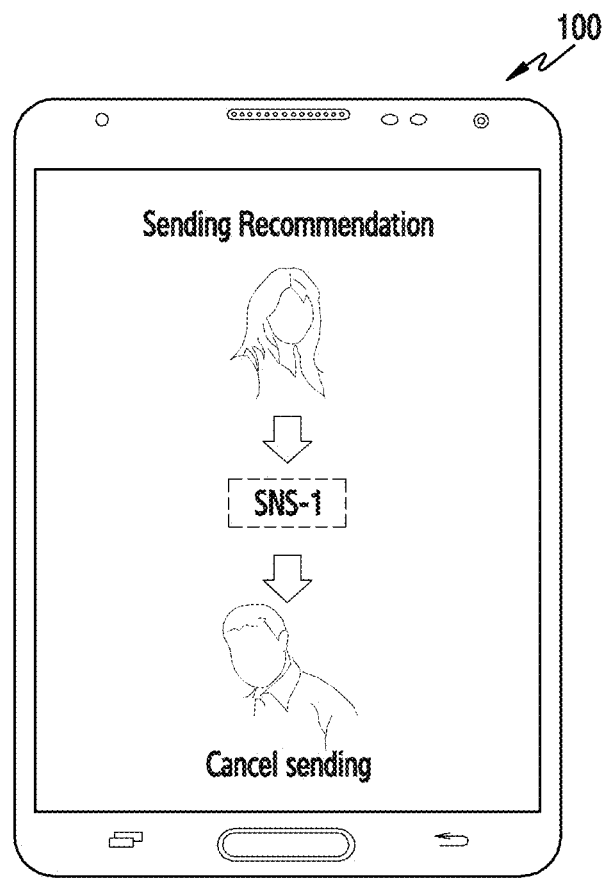
FIG. 6D shows an example illustration thereof in which a recommendation request is sent based on the intensity level of the gesture.

The user intends to stop the motion of the "JOIN" gesture when the "intensity level 2" is displayed on the screen. As the intensity level increases, the feedback generator unit 108 provides higher feedback to the user. Based on the Table 6, the controller unit 104 maps the intensity level to the type of operation and determine at the "intensity level 2" is to "Recommend for a try at least to connect and communicate". Based on the type of operations being determined, the controller unit 104 sends the recommendation request to the two friends' image objects over the SNS-1 as shown in the FIG. 6D. The FIG. 6D shows an example illustration thereof in which the recommendation request is sent based on the intensity level of the gesture.

Figure 7A:
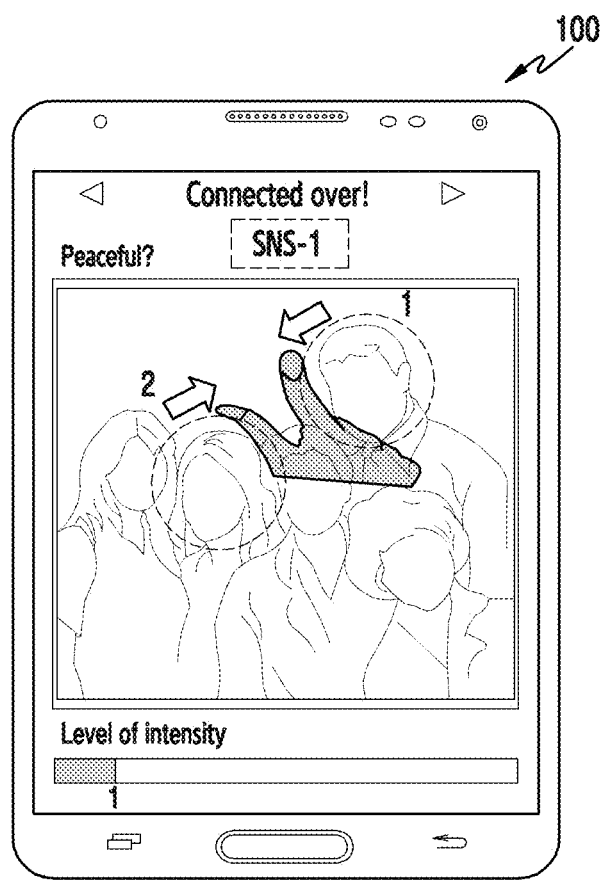
FIG. 7A shows an example illustration in which a gesture is performed on a user image object and a friend image object displayed on a screen of an electronic device, according to an embodiment as disclosed herein.

FIG. 7A shows an example illustration in which the gesture is performed on the user image object and the friend image object displayed on the screen of the electronic device 100, according to an embodiment as disclosed herein. In an embodiment, consider a scenario where the user decides to view the content related to the friend image object. For this purpose of explaining the scenario for viewing the content related to the friend image object, consider an example intensity level mapping table (i.e., Table 7) that includes information related to the various intensity level as described below:

TABLE 7

| Intensity Level | Type of operation |
|---|---|
| 1 | Latest "Provide the latest content to the user i.e., 1 week old, current or future" |
| 2 | Older "Provide content to the user i.e., 4 weeks old" |
| 3 | Complete "Provide available content to the user" |

As shown in the FIG. 7A, the user selects the friend image object (i.e., denoted by numeral "2"). The user performs the gesture on the user image object (i.e., denoted by numeral "1") and the friend image object. After detecting the gesture, the gesture detection unit 102 identifies the starting touch coordinates. Further, if the user continues to perform the gesture on the image objects, the gesture detection unit 102 identifies the new touch coordinates. The identified starting and new touch coordinates are sent to the controller unit 104.

After receiving the touch coordinates, the controller unit 104 determines the relative difference using the touch coordinates. Based on the determined relative difference, the controller unit 104 determines the type of gesture performed by the user to be the "JOIN" gesture. Further, the intensity level of the "JOIN" gesture can be determined by the controller unit 104 and simultaneously display the intensity level to the user as shown in the FIG. 7B. At the same time, the feedback generator unit 108 provides the feedback to the user based on the intensity level.

Figure 7B:
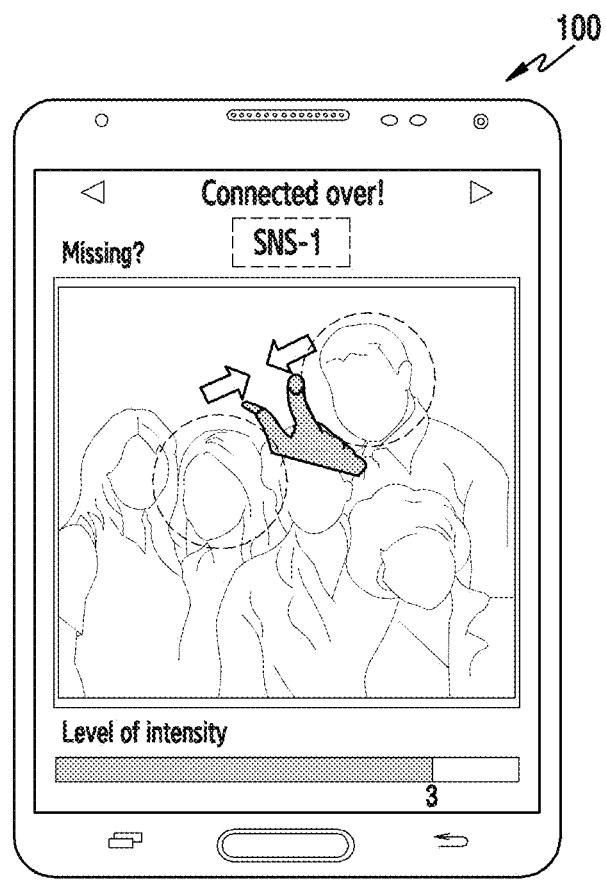
FIG. 7B shows an example illustration thereof in which an intensity level is displayed while the gesture is being performed by the user.

FIG. 7B shows an example illustration thereof in which the intensity level is displayed while the gesture is being performed by the user. While performing the gesture, the corresponding intensity level associated with the gesture is displayed substantially at the same time on the screen. As shown in the FIG. 7B, as the user intends to stop the motion of the "JOIN" gesture motion when the "intensity level 3" is displayed on the screen. As the intensity level increases, the feedback generator unit 108 provides higher feedback to the user. Based on the Table 7, the controller unit 104 maps the intensity level to the type of operation and determines that the type of operation to be performed at the "intensity level 3" is to "Provide available content to the user".

Figure 7C:
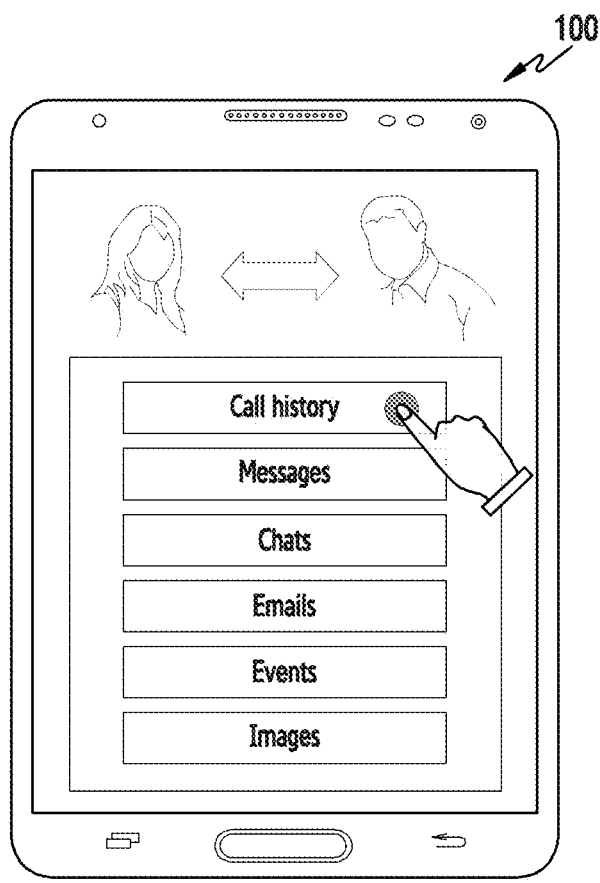
FIG. 7C shows an example illustration thereof in which content related to a friend is displayed on the screen of the electronic device.
Figure 7D:
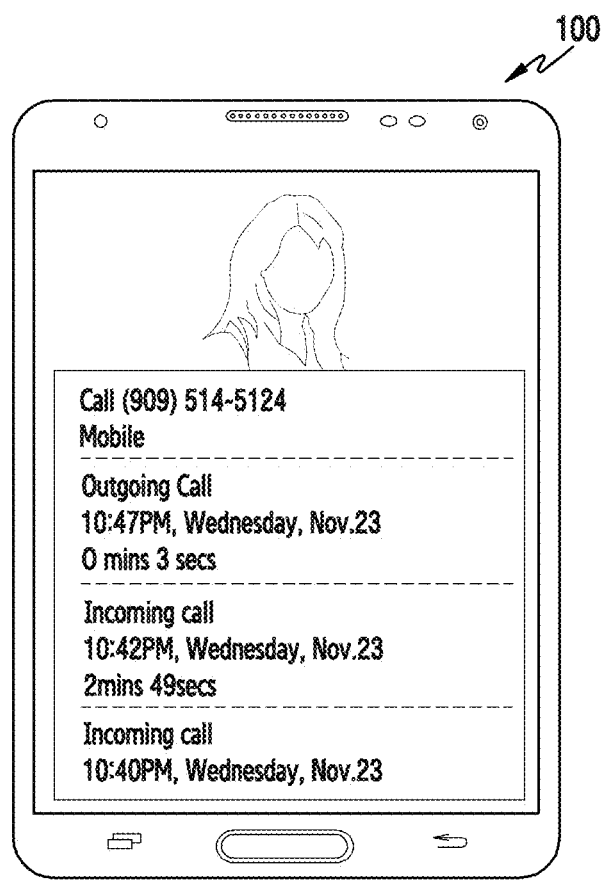
FIG. 7D shows an example illustration thereof in which details related to the friend is displayed on the screen.

Based on the type of operation being determined, the controller unit 104 extracts the available content related to the friends and is displayed on the screen as shown in the FIG. 7C. The FIG. 7C shows an example illustration thereof in which content related to the friend is displayed on the screen of the electronic device 100. The user is displayed with the options for the categories of the extracted content related to the friend. Further, the user selects the "Call history" option to view the call details. The user is displayed with the call details related to the friend as shown in the FIG. 7D. The. FIG. 7D shows an example illustration thereof in which details related to the friend is displayed on the screen.

In an embodiment, if the user decides to view the message information then, the user performs the gesture on the "Messages". The user is displayed with the messages with respect to the selected friend. In another embodiment, if the user decides to view the chat information then, the user performs the gesture on the "Chat". The user is displayed with the chat information with respect to the selected friend. In another embodiment, the user can also decide to check the email information. The user is displayed with the email information with respect to the selected friend. The user can also opt to display the events and reminders information. The user is displayed with the events and the reminders with respect to the selected friend. The user can also opt for the display of the related other images containing the selected person. The user is displayed with the images containing the other person present on the device.

Figure 7E:
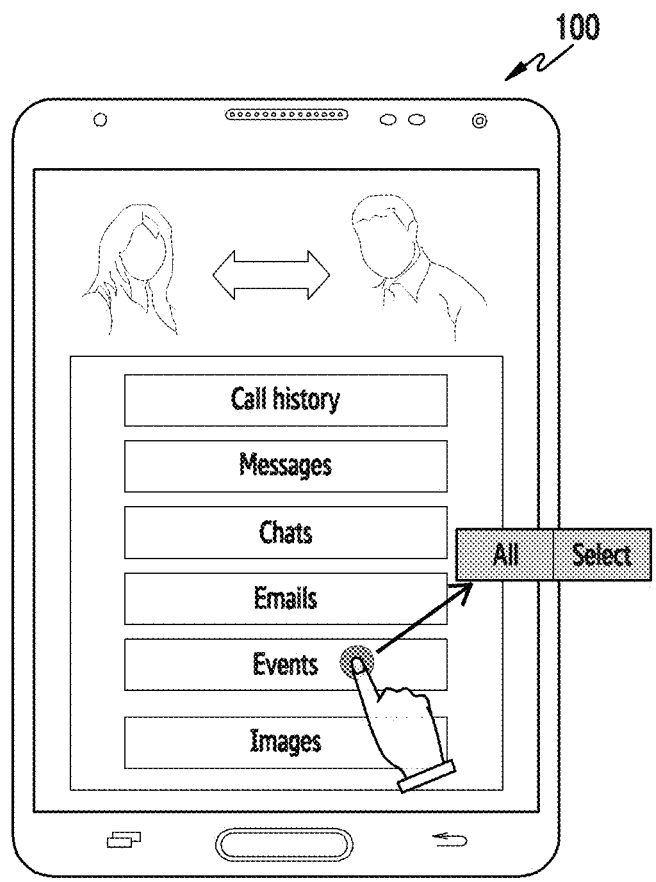
FIG. 7E shows an example illustration thereof in which a menu option is displayed on the screen.
Figure 7F:
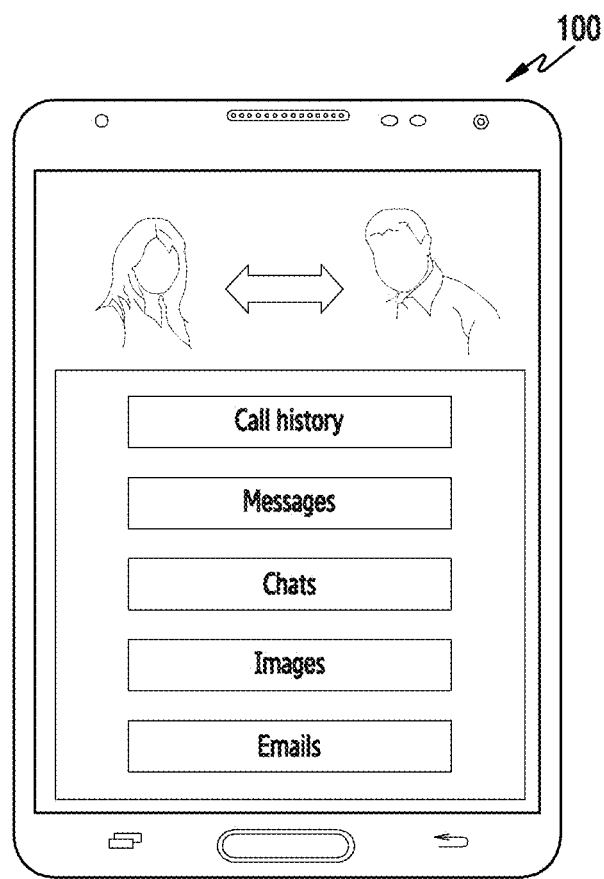
FIG. 7F shows an example illustration thereof in which updated categories are displayed after deleting events related to the friend.

In another scenario, the user selects the friend image object. The user performs the "AWAY" gesture on the user image object and the friend image object. As the user intends to stop the motion of the "AWAY" gesture when the "intensity level 3" is displayed on the screen. Based on the Table 7, the controller unit 104 maps the intensity level to the type of operation and determines that the type of operation to be performed at the "intensity level 3" is to "Provide available content to the user". Based on the type of operation being determined, the controller unit 104 extracts the available content related to the friends image object and is displayed on the screen. The user may wish to delete the events related to the friend. Here, the user is displayed with a menu option to either delete ALL or SELECT the individual events to delete as shown in the FIG. 7E. The FIG. 7E shows an example illustration thereof in which the menu option is displayed on the screen. The user may wish to delete all the events and updated category is displayed to the user as shown in the FIG. 7F. The FIG. 7F shows an example illustration thereof in which updated categories are displayed after deleting the events related to the friend.

Figure 8A:
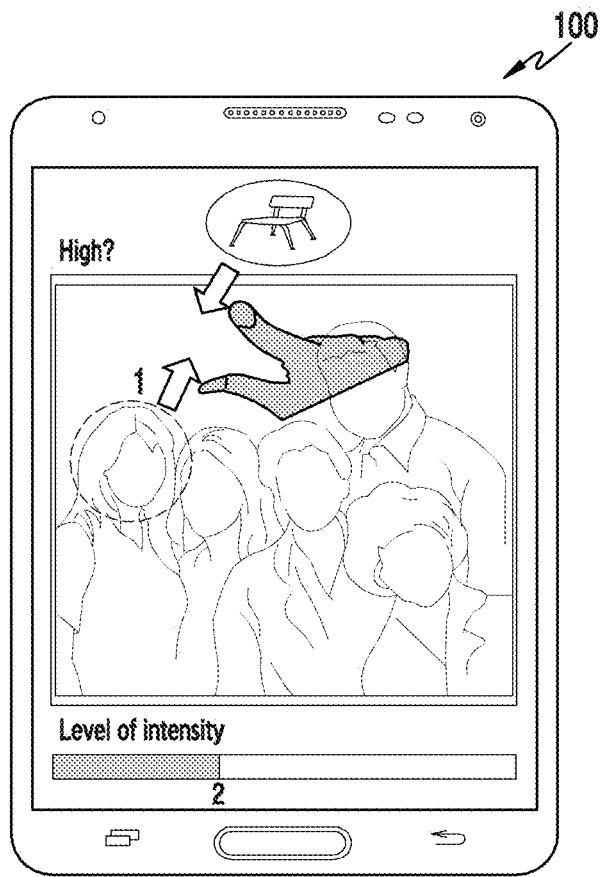
FIG. 8A shows an example illustration in which a gesture is performed on a clipart object and a friend image object; and displaying an intensity level while the gesture is being performed by a user, according to embodiments as disclosed herein.

FIG. 8A shows an example illustration in which the gesture is performed on a clipart object and the friend image object; and displaying the intensity level while the gesture is being performed by the user, according to embodiments as disclosed herein. In an embodiment, consider a scenario where the user decides to schedule a meeting between image objects. For this purpose of explaining the scenario for scheduling the meeting, consider an example intensity level mapping table (i.e., Table 8) that includes information related to the various intensity level as described below:

TABLE 8

| Intensity Level | Function "Type of operation" |
| --- | --- |
| 1 | Normal "Provide normal scheduling of meeting. With no such priority attached" |

TABLE 8-continued

| Intensity Level | Function "Type of operation" |
| --- | --- |
| 2 | High "Perform scheduling of meeting with high priority attached, making it mandatory for person to attend it but the meeting can be rescheduled if someone desires so". |
| 3 | Urgent "Perform scheduling of meeting with very high priority, making it mandatory for people to attend and meeting cannot be rescheduled". |

In this scenario, an example mapping table (i.e., Table 9) describing various clipart that are mapped with the functionality is shown below:

TABLE 9

| Clipart object | Functionality |
| --- | --- |
| Chair object | To be used to schedule a meeting with persons |
| Telephone object | To be used to place a call to the selected person |
| Pen object | To be used to send a text or an email to the selected person |
| Glue object | To be used to put a reminder or event for a selected person or image object |
| Trash can object | To be used to trash the content relative to selected person or image object |

As shown in the FIG. 8A, the user selects the friend image object (i.e., denoted by numeral "1"). The user is also provided with the clipart access menu. The clipart objects are displayed to the user. The user selects the clipart object "Chair" as the user needs to schedule the meeting. The user performs the gesture on the chair object and the friend image object. After detecting the gesture, the starting touch coordinates of the gesture are identified by the gesture detection unit 102. Further, if the user continues to perform the gesture motion on the chair object and the friend image object, the gesture detection unit 102 identifies the new touch coordinates. The identified starting and new touch coordinates are sent to the controller unit 104.

After receiving the touch coordinates, the controller unit 104 determines the relative difference using the touch coordinates. Based on the determined relative difference, the controller unit 104 determines type of gesture performed by the user to be the "JOIN" gesture. Further, the intensity level of the "JOIN" gesture can be determined by the controller unit 104 and simultaneously display the intensity level to the user as shown in the FIG. 8A. At the same time, the feedback generator unit 108 provides the feedback to the user based on the intensity level.

As the user intends to stop the motion of the "JOIN" gesture when the "intensity level 2" is displayed on the screen. Based on the intensity level mapping table (i.e., Table 9), the controller unit 104 maps the intensity level to the type of operation and determines that the type of operation to be performed at the "intensity level 2" is to "Schedule the meeting with high priority attached, making it mandatory for the friend to attend it but the meeting can be scheduled if someone desires so".

Figure 8B:
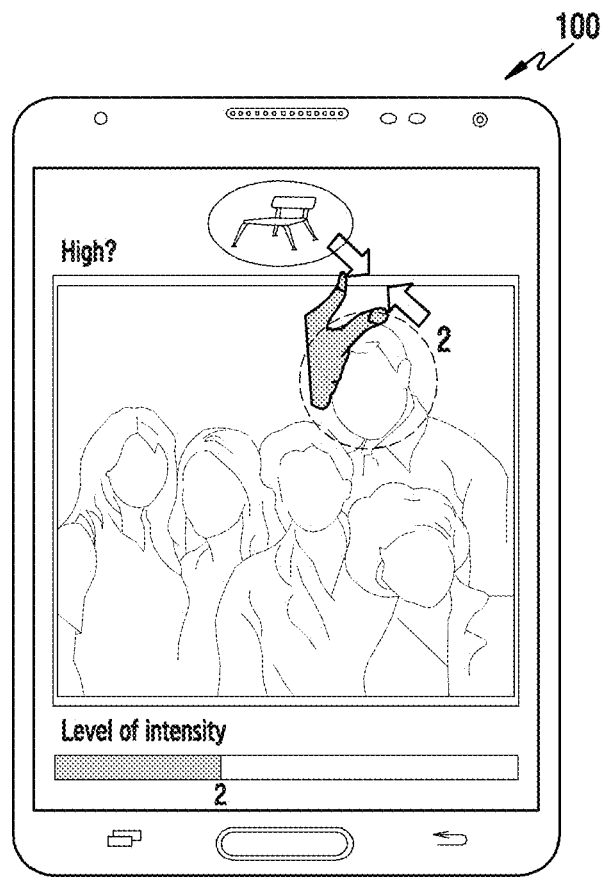
FIG. 8B shows an example illustration thereof in which the gesture is performed on the clipart object and another friend image object; and displaying an intensity level while the gesture is being performed by the user.

FIG. 8B shows an example illustration thereof in which the gesture is performed on the clipart object and another friend image object; and displaying the intensity level while the gesture is being performed by the user. As shown in the FIG. 8B, the user selects another friend image object (i.e., denoted by numeral "2"). The user performs the "JOIN"

gesture on another friend image object and the "Chair" object. As the user intends to stop the motion of the "JOIN" gesture when the "intensity level 2" is displayed on the screen. Based on the Table 9, the controller unit 104 maps the intensity level to the type of operation and determines that the type of operation to be performed at the "intensity level 2" is to "Schedule the meeting with high priority attached, making it mandatory for the friend to attend it but the meeting can be scheduled if someone desires so".

Figure 8C:
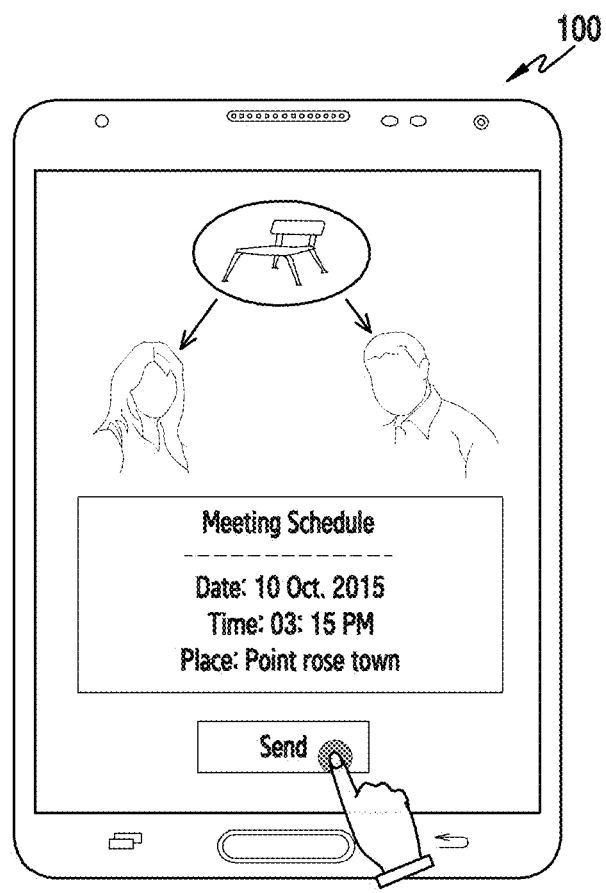
FIG. 8C shows an example illustration thereof in which details related to a meeting schedule are displayed on a screen of an electronic device.

FIG. 8C shows an example illustration thereof in which the details related to the meeting schedule are displayed on the screen of the electronic device 100.

Figure 8D:
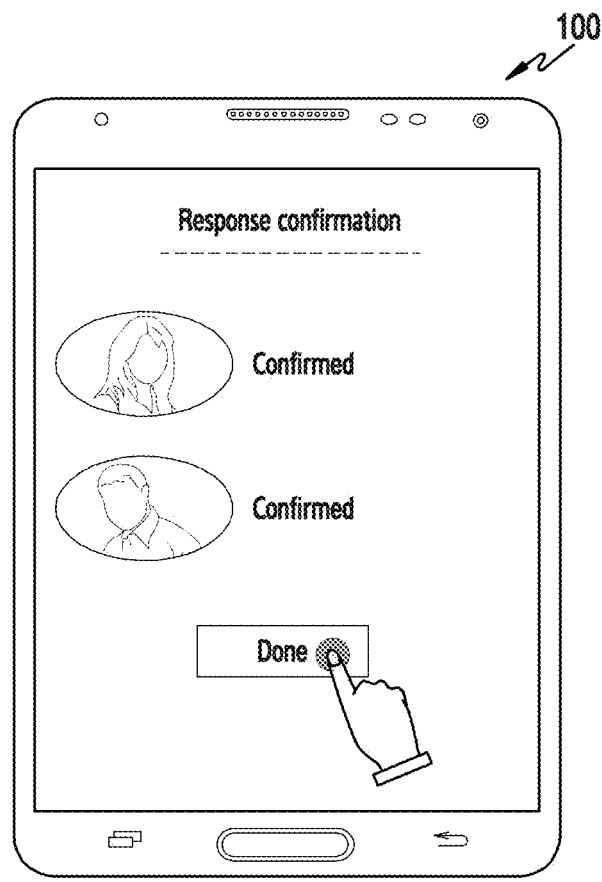
FIG. 8D shows an example illustration thereof in which confirmation messages are received and displayed on the screen.

FIG. 8D shows an example illustration thereof in which the confirmation messages are received and displayed on the screen. As shown in the FIG. 8D, the electronic device 100 receives confirmation messages from the selected image objects.

Figure 8E:
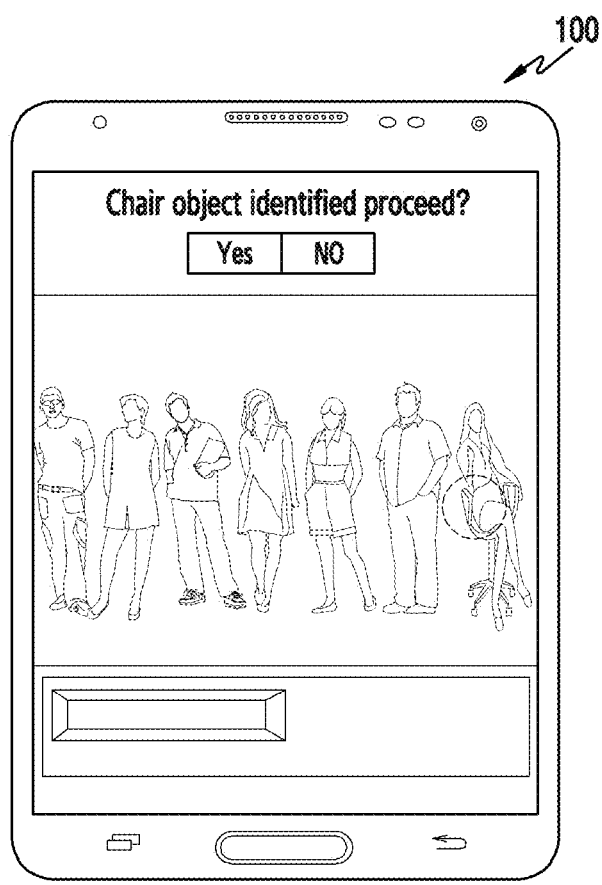
FIG. 8E shows an example illustration thereof in which the clipart object is identified in the image selected by the user.

FIG. 8E shows an example illustration thereof in which the clipart object is identified in the image selected by the user. In another scenario, as shown in the FIG. 8E, the user identifies the "Chair" object in the image and decides to select the "Chair" object. After identifying the "Chair" object, the user is also provided with the option to proceed further or not. On selecting to proceed further, the "Chair" object can be used to schedule meetings with the image objects as described above.

In another scenario, the user may select the clipart object "Telephone" to initiate a call to the selected image object. The user selects the image object and initiates performing the "JOIN" gesture by joining the selected image object to the "Telephone" object. The intensity of the "JOIN" gesture and the meaning for the corresponding intensity level is displayed to the user. The user decides to stop the "JOIN" gesture at the "intensity level 3". Based on the Table 9, the controller unit 104 maps the intensity level to the type of operation and determines that the type of operation to be performed at the "intensity level 3" is to initiate "very urgent" call with the image object using one of the possible communication modes displayed on the screen as shown in the FIG. 8F.

Figure 8F:
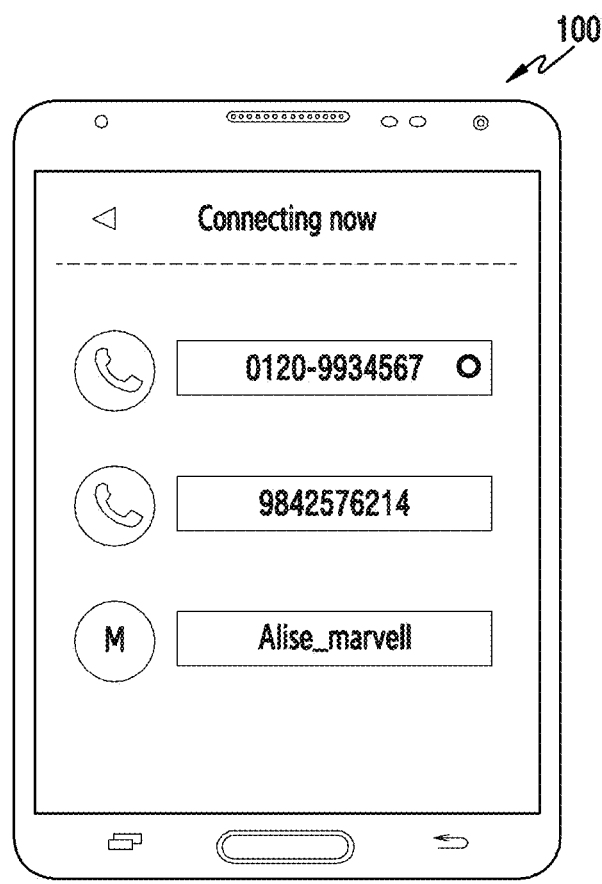
FIG. 8F shows an example illustration thereof in which all possible communication modes between the user and the image object are displayed on the screen.

FIG. 8F shows an example illustration thereof in which all possible communication modes between the user and the selected image object are displayed on the screen. The user can view the current communication mode being attempted and the call is connected between the user and the selected image object using any one of the communication mode.

Figure 9A:
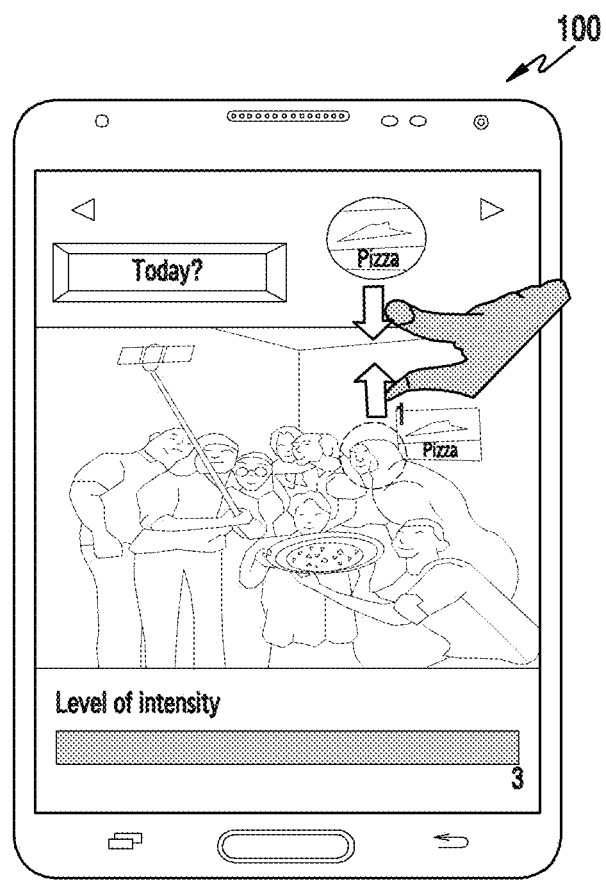
FIG. 9A shows an example illustration in which a gesture is performed on a clipart object and a friend image object; and displaying an intensity level while the gesture is being performed by a user, according to embodiments as disclosed herein.

FIG. 9A shows an example illustration in which the gesture is performed on the clipart object and the friend image object; and displaying the intensity level while the gesture is being performed by the user, according to embodiments as disclosed herein. In an embodiment, consider a scenario in which the user decides to arrange a get together between image objects by recalling past moments. For this purpose of explaining the scenario for scheduling the meeting, consider an example intensity level mapping table (i.e., Table 10) that includes information related to the various intensity level as described below:

TABLE 10

| Urgency Level | function "Operation to be performed" |
| --- | --- |
| 1 | Today "To arrange a get together on the same day" |
| 2 | Weekend "To arrange a get together on weekend" |

TABLE 10-continued

| Urgency Level | function "Operation to be performed" |
| --- | --- |
| 3 | Special "To arrange a get together on a special day i.e., birthday, anniversary etc." |

As shown in the FIG. 9A, the user selects the friend image object (i.e., denoted by numeral "1"). The user decides to arrange the get together between the friend image object and the user image object (i.e., denoted by numeral "2"). The meeting place for arranging get together is identified as "Pizza home" in the background of the image and the user selects the "Pizza home" object. The "Pizza home" object is displayed to the user and the user is prompted to proceed further or not. The user continues to proceed further and use the "Pizza home" object for scheduling the get together.

The user performs the gesture on the "Pizza home" object and the friend image object. After detecting the gesture, the starting touch coordinates of the gesture are identified by the gesture detection unit 102. Further, if the user continues to perform the gesture motion on the friend image object and the "Pizza home" object, the gesture detection unit 102 identifies the new touch coordinates. The identified starting and new touch coordinates are sent to the controller unit 104.

After receiving the touch coordinates, the controller unit 104 determines the relative difference using the touch coordinates. Based on the determined relative difference, the controller unit 104 determines type of gesture performed by the user to be the "JOIN" gesture. Further, the intensity level of the "JOIN" gesture can be determined by the controller unit 104 and simultaneously display the intensity level to the user as shown in the FIG. 9A. At the same time, the feedback generator unit 108 provides the feedback to the user based on the intensity level.

As the user intends to stop the motion of the "JOIN" gesture when the "intensity level 3" is displayed on the screen. Based on the intensity level mapping table (i.e., Table 10), the controller unit 104 maps intensity level to the type of operation and determine that the type of operation to be performed at the "intensity level 3" is to "Arrange the get together on a birthday occasion".

Figure 9B:
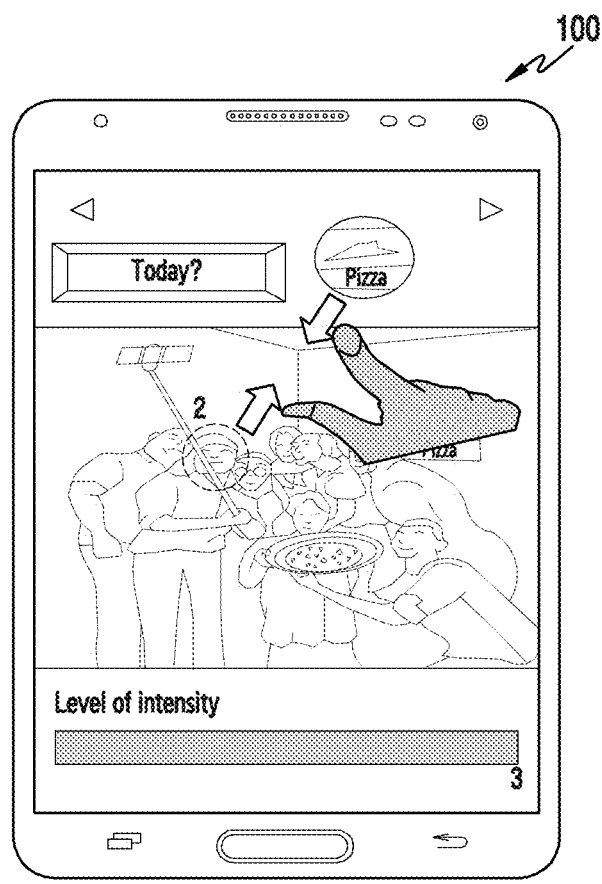
FIG. 9B shows an example illustration thereof in which the gesture is performed on the clipart object and the user image object; and displaying an intensity level while the gesture is being performed by the user.

FIG. 9B shows an example illustration thereof in which the gesture is performed on the clipart object and the user image object; and displaying the intensity level while the gesture is being performed by the user. As shown in the FIG. 9B, the user selects the user image object. The user performs the "JOIN" gesture on the user image object and the "Pizza home" object. As the user intends to stop the motion of the "JOIN" gesture when the intensity level "3" is displayed on the screen. Based on the Table 10, the controller unit 104 maps the intensity level to the type of operation and determines that the type of operation to be performed at the "intensity level 3" is to "Arrange the get together on the birthday occasion.

Figure 9C:
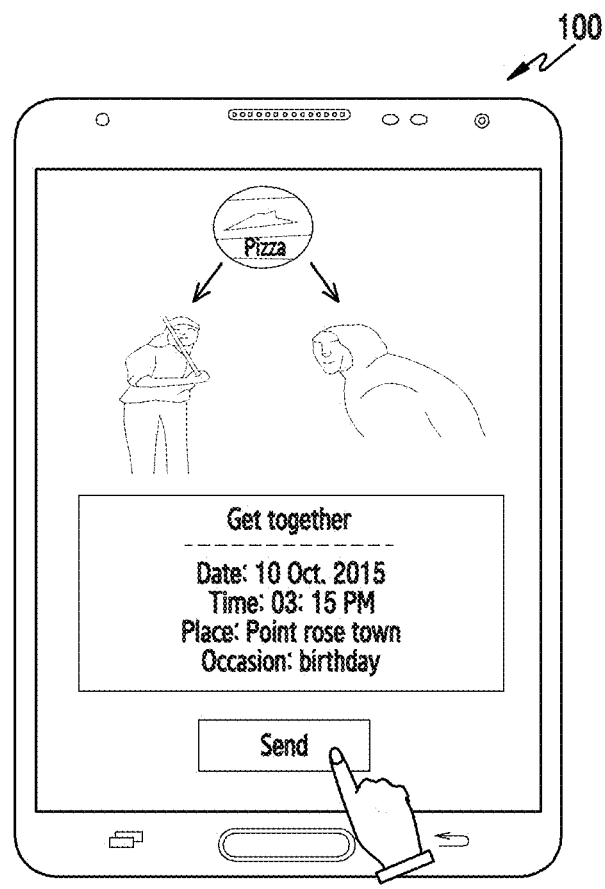
FIG. 9C shows an example illustration thereof in which details related to a get together are displayed on a screen of an electronic device.

FIG. 9C shows an example illustration thereof in which the details related to the get together are displayed on the screen of the electronic device 100.

Figure 9D:
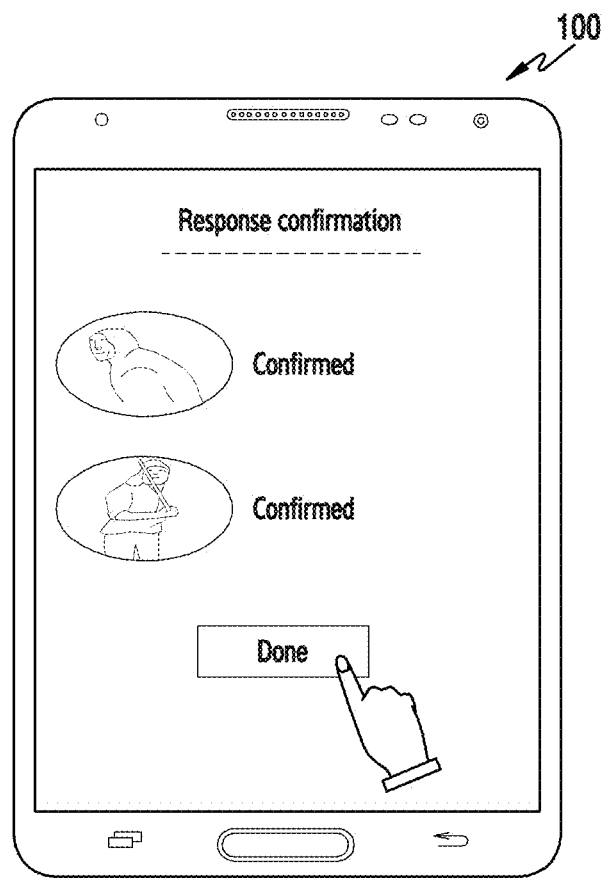
FIG. 9D shows an example illustration thereof in which confirmation message is received and displayed on the screen.

FIG. 9D shows an example illustration thereof in which the confirmation message is received and displayed on the screen. As shown in the FIG. 9C, the electronic device 100 receives the confirmation message from the image object thus, completing the process.

Figure 10A:
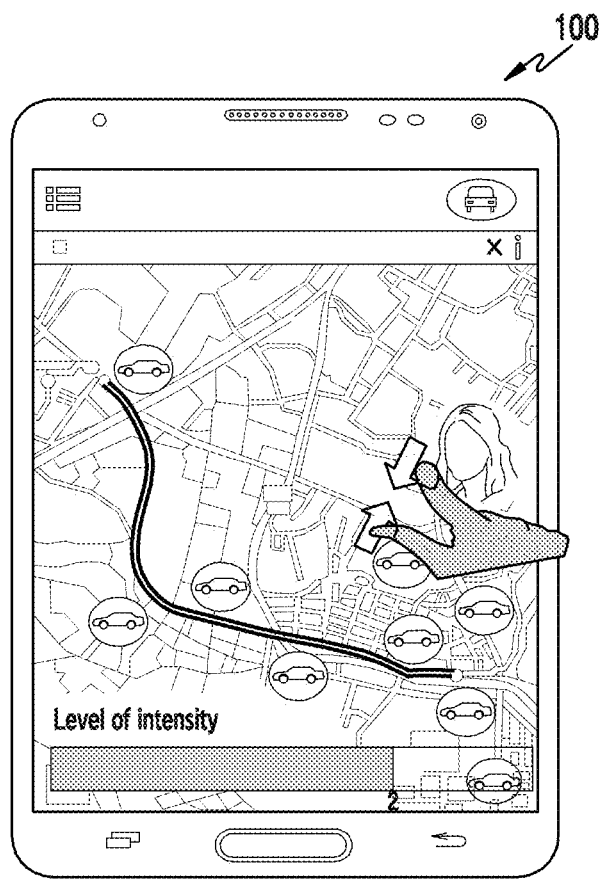
FIG. 10A shows an example illustration in which a gesture is performed on a car object and a user image object displayed on a map; and displaying an intensity level while the gesture is being performed by a user, according to embodiments as disclosed herein.

FIG. 10A shows an example illustration in which the gesture is performed on a car object and the user image object displayed on a map; and displaying the intensity level while the gesture is being performed by the user, according to embodiments as disclosed herein. In an embodiment, consider a scenario where the user decides to request for a car pooling service. For this purpose of explaining the scenario for requesting the carpooling service, consider an example intensity level mapping table (i.e., Table 11) that includes information related to the various intensity level as described below:

TABLE 11

| Urgency Level | Function "Type of operation" |
|---|---|
| 1 | Normal<br>"Normal priority pickup" |
| 2 | Urgent<br>"Urgent priority pickup" |
| 3 | Exclusive<br>"Urgent and exclusive priority request" |

As shown in the FIG. 10A, the user accesses the map to view nearby cars for requesting the car pool service. In the map, all the nearby cars which are in proximity to the user's location are displayed. The user performs the gesture on the user image object and the car object on the map. After detecting the gesture, the gesture detection unit 102 identifies the starting touch coordinates. Further, if the user continues to perform the gesture motion on the image objects, the gesture detection unit 102 identifies the new touch coordinates. The identified starting and new touch coordinates are sent to the controller unit 104.

After receiving the touch coordinates, the controller unit 104 determines the relative difference using the touch coordinates. Based on the determined relative difference, the controller unit 104 determines type of gesture performed by the user to be the "JOIN" gesture. Further, the intensity level of the "JOIN" gesture can be determined by the controller unit 104 and simultaneously display the intensity level to the user as shown in the FIG. 10A. At the same time, the feedback generator unit 108 provides the feedback to the user based on the intensity level.

As the user intends to stop the motion of the "JOIN" gesture when the "intensity level 2" is displayed on the screen. Based on the intensity level mapping table (i.e., Table 11), the controller unit 104 maps the intensity level to the type of operation and determines that the type of operation to be performed at the "intensity level 2" is to schedule "Urgent priority pickup". Further, the controller unit 104 sends the request to the person of the selected car for carpooling confirmation as shown in the FIG. 10B.

Figure 10B:
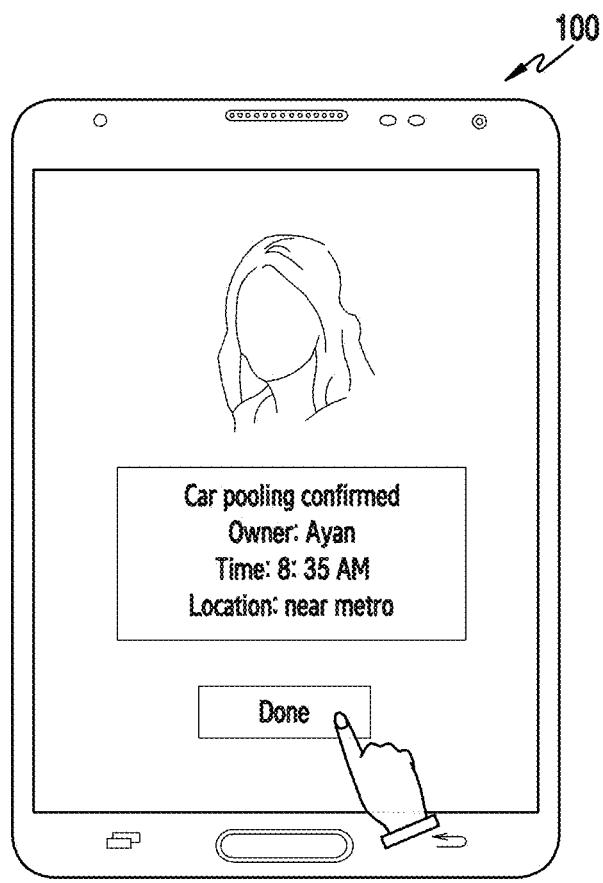
FIG. 10B shows an example illustration thereof in which a carpool confirmation is displayed on a screen of an electronic device.

FIG. 10B shows an example illustration thereof in which the carpool confirmation is displayed on the screen of the electronic device 100. After the person of the selected car accepts the carpooling request, a confirmation message is received and displayed on the screen of the electronic device 100 as shown in the FIG. 10B.

Figure 11A:
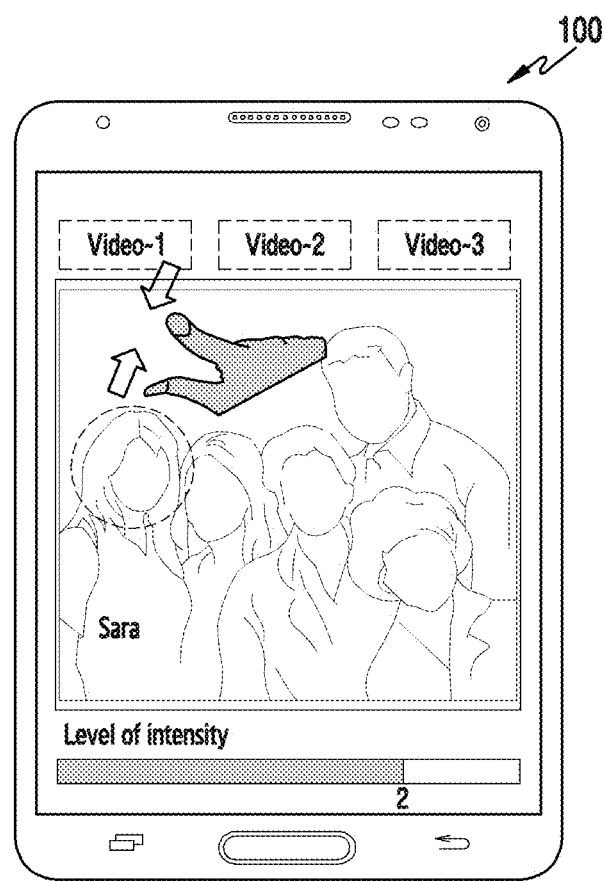
FIG. 11A shows an example illustration in which a gesture is performed on a media file object and a friend image object; and displaying an intensity level while the gesture is being performed by a user, according to embodiments as disclosed herein.

FIG. 11A shows an example illustration in which the gesture is performed on a media file object and the friend image object; and displaying the intensity level while the gesture is being performed by the user, according to embodiments as disclosed herein. In an embodiment, consider a scenario where the user decides to share the media file with the friend. For this purpose of explaining the scenario for sharing the media files, consider an example intensity level mapping table (i.e., Table 12) that includes information related to the various intensity level as described below:

TABLE 12

| Urgency Level | Function "Type of operation" |
|---|---|
| 1 | Normal<br>"Share the current version of the video as it is" |
| 2 | Specific<br>"Share the version of video or subtitles specific to the first preferred language of the person. If not available then do not share" |
| 3 | Priority<br>"Share the version of the video available but as per the priority of the preferred language of the person, maintained in that order" |

As shown in the FIG. 11A, the user then selects the friend image object "Sara". The user access the recently viewed videos, recently viewed images, and recently played music from the gallery application. On selecting the recently viewed videos, a list of videos (i.e., Video-1, Video-2, Video-3, and so on) are scrolled and displayed to the user. The user decides to select the Video-1 and initiates performing gesture on the Video-1 object and the friend image object "Sara". After detecting the gesture, the gesture detection unit 102 identifies the starting touch coordinates. Further, if the user continues to perform the gesture motion on the video-1 object and the friend image object "Sara", the gesture detection unit 102 identifies the new touch coordinates. The identified starting and new touch coordinates are sent to the controller unit 104.

After receiving the touch coordinates, the controller unit 104 determines the relative difference using the touch coordinates. Based on the determined relative difference, the controller unit 104 determines type of gesture performed by the user to be the "JOIN" gesture. Further, the intensity level of the "JOIN" gesture can be determined by the controller unit 104 and simultaneously display the intensity level to the user as shown in the FIG. 11A. At the same time, the feedback generator unit 108 provides the feedback to the user based on the intensity level.

Figure 11B:
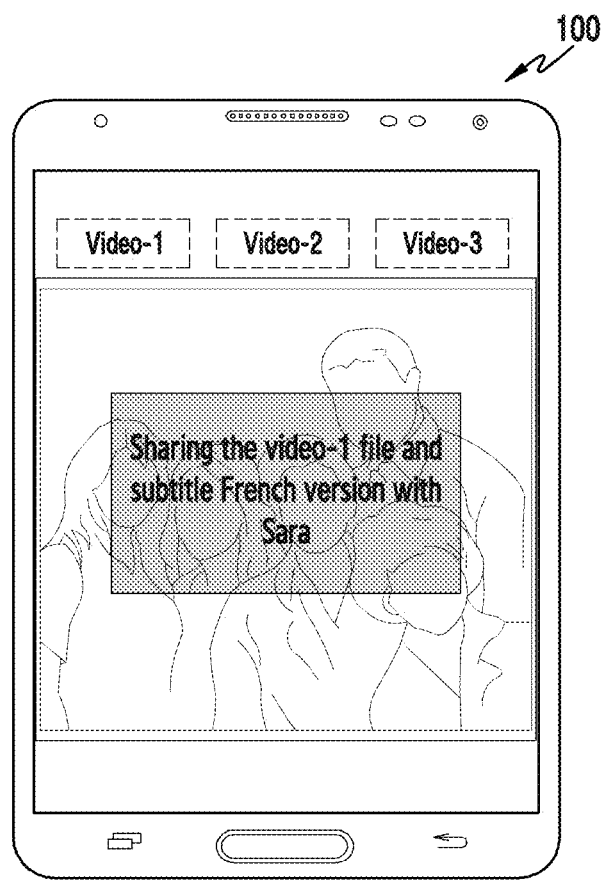
FIG. 11B shows an example illustration thereof in which video-1 object is shared with friend "Sara"

As the user intends to stop the motion of the "JOIN" gesture when the "intensity level 2" is displayed on the screen. Based on the intensity level mapping table (i.e., Table 12), the controller unit 104 intensity level to the type of operation and determines that the type of operation to be performed at the "intensity level 2" is to "Share the version of video or subtitles specific to the first preferred language of the person, if not available then do not share". Further, the controller unit 104 shares the Video-1 object with the friend "Sara" as shown in FIG. 11B. The FIG. 11B shows an example illustration thereof in which the video-1 object is shared with friend "Sara".

Figure 12A:
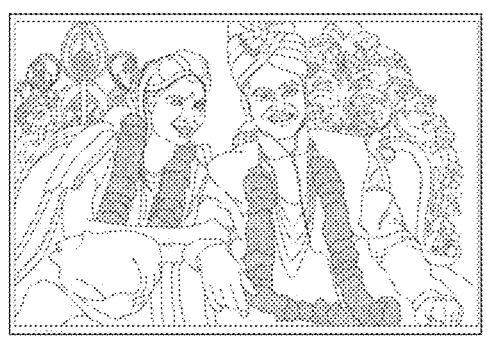
FIG. 12A shows an example illustration in which a sequence of frames in a video are displayed, according to embodiment as disclosed herein.
Figure 12A:
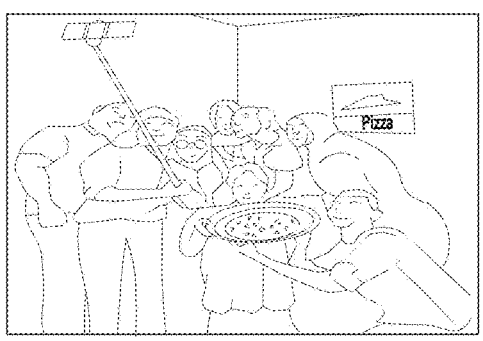
Figure 12A:
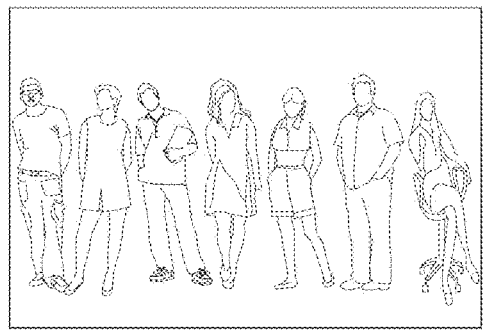
Figure 12A:
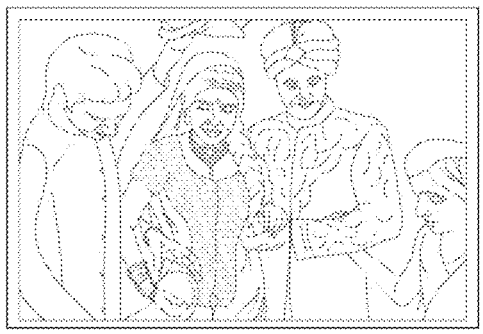

FIG. 12A shows an example illustration in which a sequence of frames in a video are displayed, according to embodiment as disclosed herein. In an embodiment, consider a scenario where the user needs to fast forward the video. For this purpose, consider an example intensity level mapping table (i.e., Table 13) that includes information related to the various intensity level as described below:

TABLE 13

| Intensity Level | Function "Type of operation" |
|---|---|
| 1 | 2x forward<br>"Forward the remaining frames in the video with 2x speed" |
| 2 | 4x forward<br>"Forward the remaining frames in the video with 4x speed" |

TABLE 13-continued

| Intensity Level | Function "Type of operation" |
|---|---|
| 3 | Skip<br>"Skip the remaining frames altogether" |

As shown in the FIG. 12A, the video file is preprocessed into multiple continuous frames (i.e., 1 to 4). In the conventional systems and methods, if the user desires to fast forward the video with 2× speed then, then the frames in the video are fast forwarded with the selected speed. While the video is fast forwarding, to view any interested frames, the user need to manually halt the process and continue playing the video from the interested frames. Unlike the conventional systems and methods, in the proposed mechanism, the user performs the gesture on the two image objects as shown in the FIG. 12B.

Figure 12B:
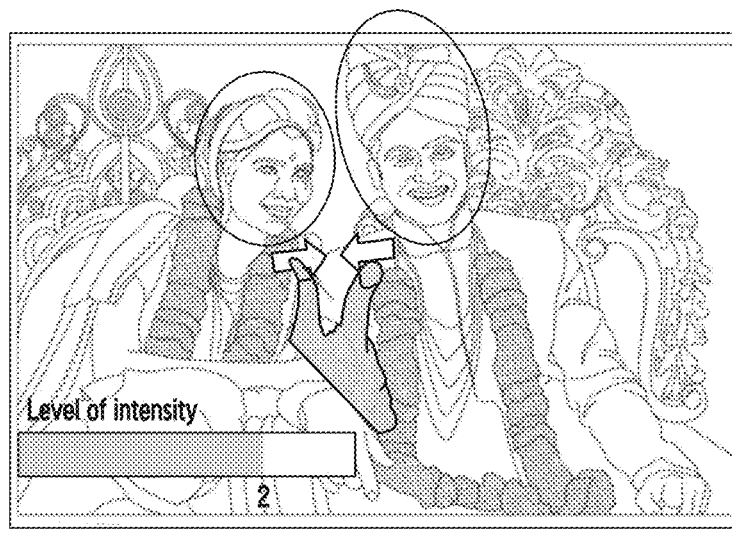
FIG. 12B shows an example illustration thereof in which a gesture is performed on the image objects and displaying an intensity level while the gesture is being performed by a user.

FIG. 12B shows an example illustration thereof in which the gesture is performed on the image objects and displaying the intensity level while the gesture is being performed by the user. The gesture is performed on the image objects to provide the user with only those frames containing the selected image objects in the video playback and skip the remaining frames. The gesture detection unit 102 identifies the starting touch coordinates. Further, if the user continues to perform the gesture motion on the objects, the gesture detection unit 102 identifies the new touch coordinates. The identified starting and new touch coordinates are sent to the controller unit 104.

After receiving the touch coordinates, the controller unit 104 determines the relative difference using the touch coordinates. Based on the determined relative difference, the controller unit 104 determines type of gesture performed by the user to be the "JOIN" gesture. Further, the intensity level of the "JOIN" gesture can be determined by the controller unit 104 and simultaneously display the intensity level to the user as shown in the FIG. 12B. At the same time, the feedback generator unit 108 provides the feedback to the user based on the intensity level.

As the user intends to stop the motion of the "JOIN" gesture when the "intensity level 1" is displayed on the screen. Based on the Table 13, the controller unit 104 maps intensity level to the type of operation and determines that the type of operation to be performed at the "intensity level 1" is to "Forward the remaining frames in the video with 2× speed" as shown in the FIG. 12C.

Figure 12C:
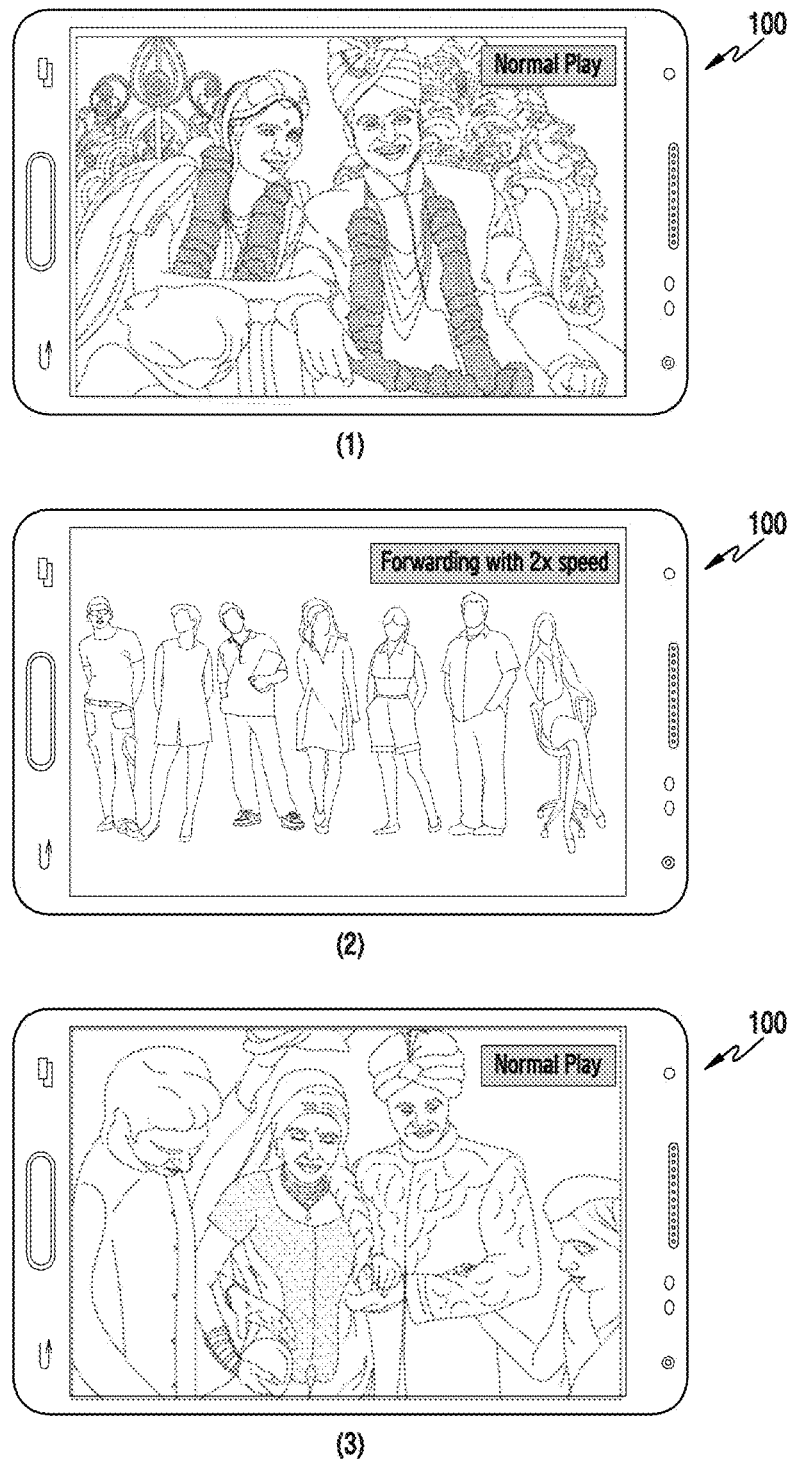
FIG. 12C shows an example illustration thereof in which the video is forwarded with 2× speed when the user interested frames are not present.

FIG. 12C shows an example illustration thereof in which the video forwarded with 2× speed where the user interested frames are not present. As shown in the FIG. 12C, the frame "1" where the selected objects are present will be playback to the user in the video player. This will enable the user to view the interested frames of the video. When the frame "2" of the video is reached then, the video is fast forwarded with 2× speed as the frame "2" does not includes user selected objects. Further, in the frame "3" the selected objects are present and the video will be playback to the user in normal mode.

Figure 13A:
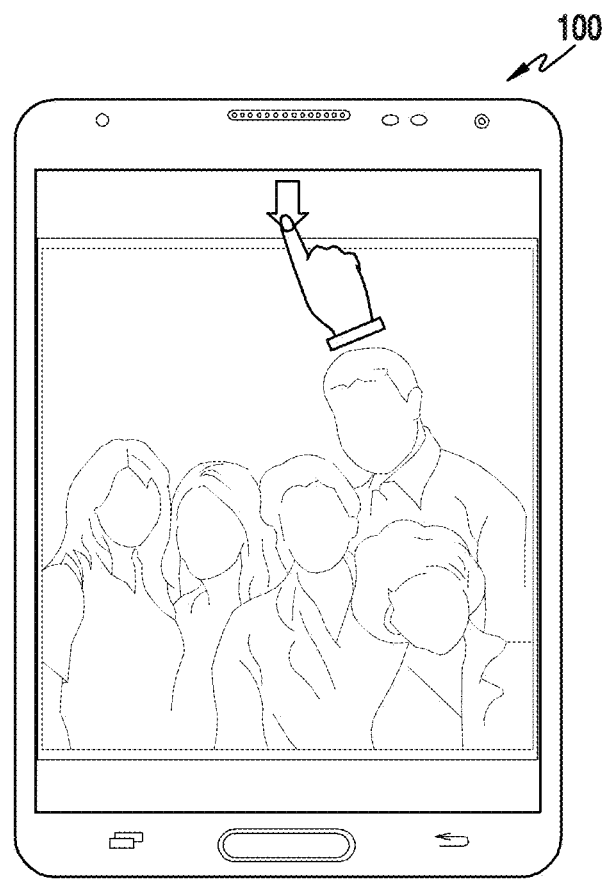
FIG. 13A shows another example illustration in which the user access a Drop-Down menu by performing a gesture on a screen of an electronic device, according to an embodiment as disclosed herein.

FIG. 13A shows another example illustration in which the user accesses a Drop-Down menu by performing the gesture on the screen of the electronic device 100, according to an embodiment as disclosed herein. In an embodiment, consider a scenario where the user decides to send the connection request to the friend image object over the SNS. For the purpose of explaining the scenario for sending the connection request, consider an example intensity level mapping table (i.e., Table 14) that includes information related to the intensity level as described below:

TABLE 14

| Intensity Level | Function "Type of operation" |
|---|---|
| 1 | SNS-1<br>"Connect with user over SNS-1" |
| 2 | SNS-2<br>"Connect over SNS-2" |
| 3 | SNS-3<br>"Connect over SNS-3" |
| 4 | SNS-4<br>"Connect over SNS-4" |

Figure 13B:
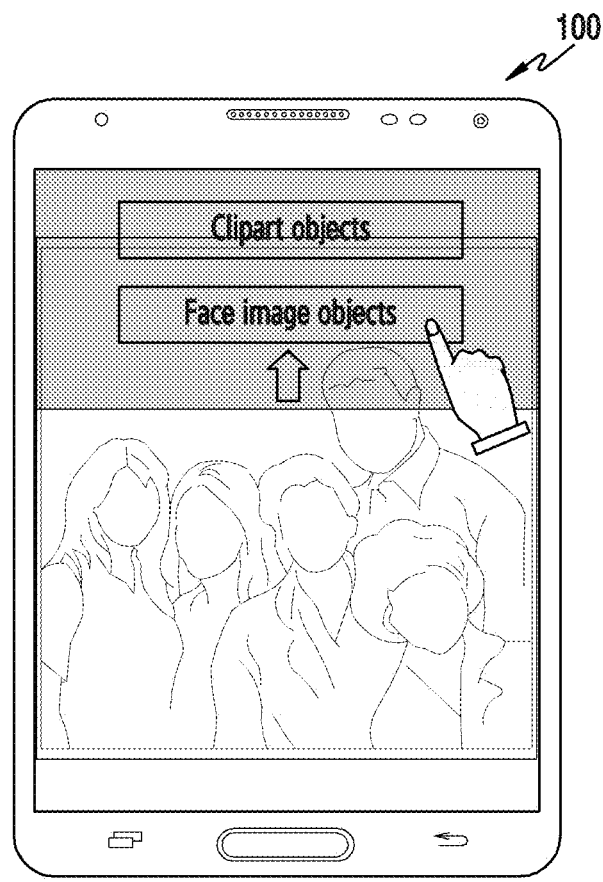
FIG. 13B shows an example illustration thereof in which a user is displayed with clipart objects and face image objects on the screen.
Figure 13C:
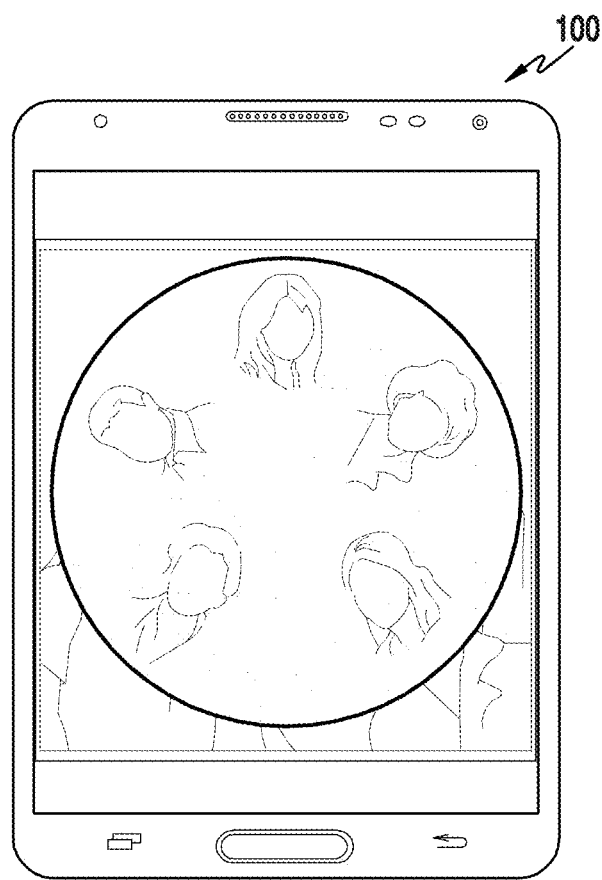
FIG. 13C shows an example illustration thereof in which the detected face image objects are displayed in a circular order on the screen.

As shown in the FIG. 13A, the user accesses the Drop-Down menu by performing the gesture. The user is displayed with the options of "Clip art objects" and "Face image objects as shown in FIG. 13B. The FIG. 13B shows an example illustration thereof in which the user is displayed with the clipart objects and face image objects on the screen. The user selects the "Face image objects" option as shown in the FIG. 13B. The detected faces in the image are displayed in a circular order as shown in FIG. 13C. The FIG. 13C shows an example illustration thereof in which the detected face image objects are displayed in the circular order on the screen.

Figure 13D:
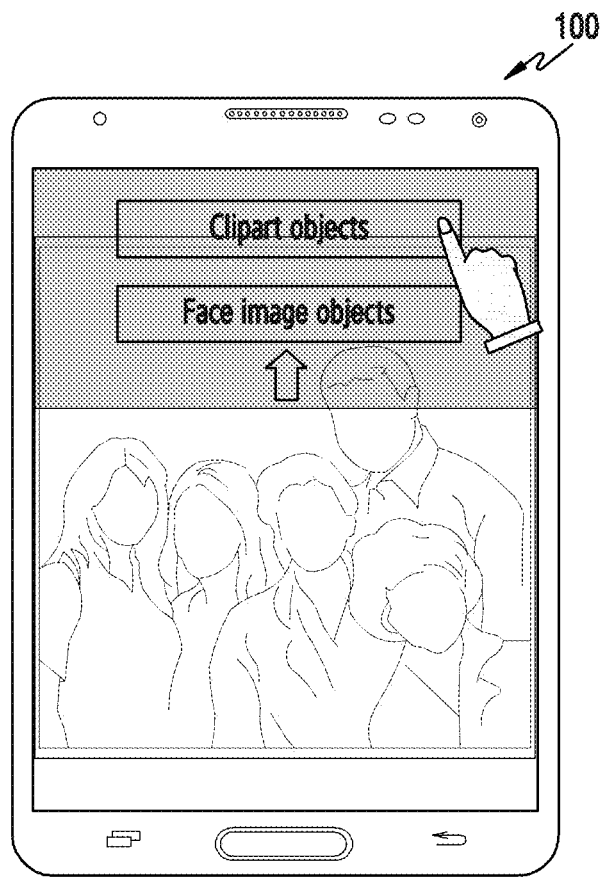
FIG. 13D shows an example illustration thereof in which the user performs the gesture on the clipart objects.
Figure 13E:
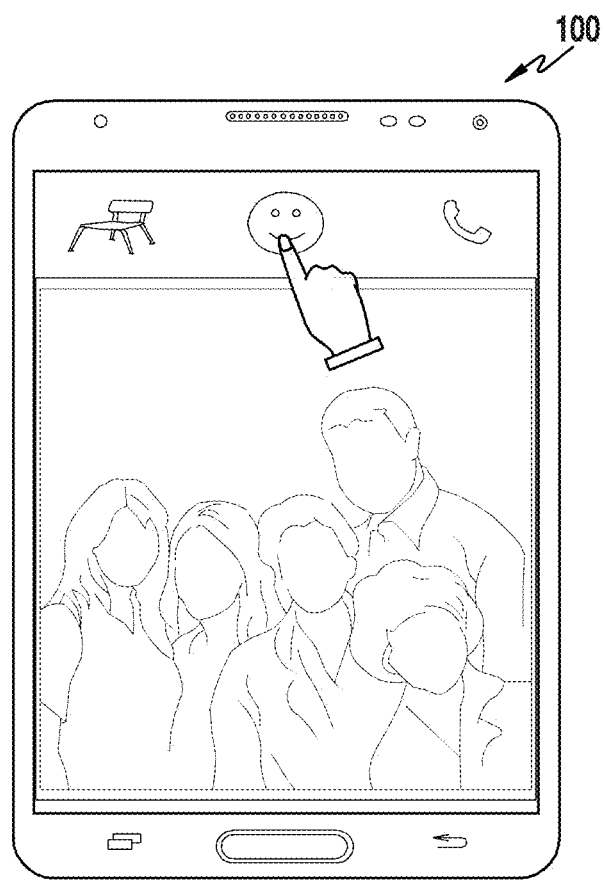
FIG. 13E shows an example illustration in which the user selects his/her image.
Figure 13F:
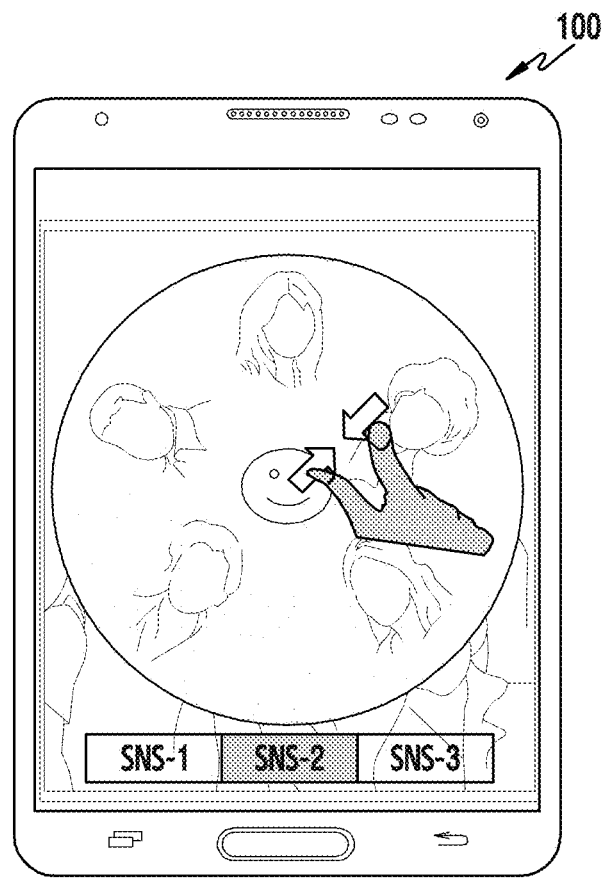
FIG. 13F shows an example illustration in which the gesture is performed on the image objects.

FIG. 13D shows an example illustration thereof in which the user performs the gesture on the clipart objects. As shown in the FIG. 13D, the user can access the "Clipart objects" to select the user's image object as shown in FIG. 13E. The FIG. 13E shows an example illustration in which the user selects his/her image. The user selects his/her image object as shown in the FIG. 13E. Further, the user performs the "JOIN" gesture over the user image object and the friend image object as shown in FIG. 13F. The FIG. 13F shows an example illustration in which, while the gesture is performed on the image objects, an intensity level bar indicating social networking icons (For example, SNS 1, SNS 2, and SNS 3) is simultaneously displayed. Unlike the other embodiments, the application icons can also be displayed as intensity level in the intensity level bar in which the associated operation has to be performed. Although, the FIG. 13F shows the social networking icons as SNS 1, SNS 2, and SNS 3 but it is to be understood that other embodiments are not limited thereon. In real-time, actual icons of the social networking sites or any other application can be displayed. For example, as shown in the FIG. 13F, when the user performs the gesture on the image objects, the actually Facebook™ icon, Twitter™ icon, LinkedIn™ icon or the like can be displayed based on the intensity level of the gesture, such to determine the type of application in which the user would like to perform an operation. Further, in an embodiment, a marker or highlighter transitioned from one icon to another is displayed when a change in the intensity level of the gesture is detected.

Figure 13G:
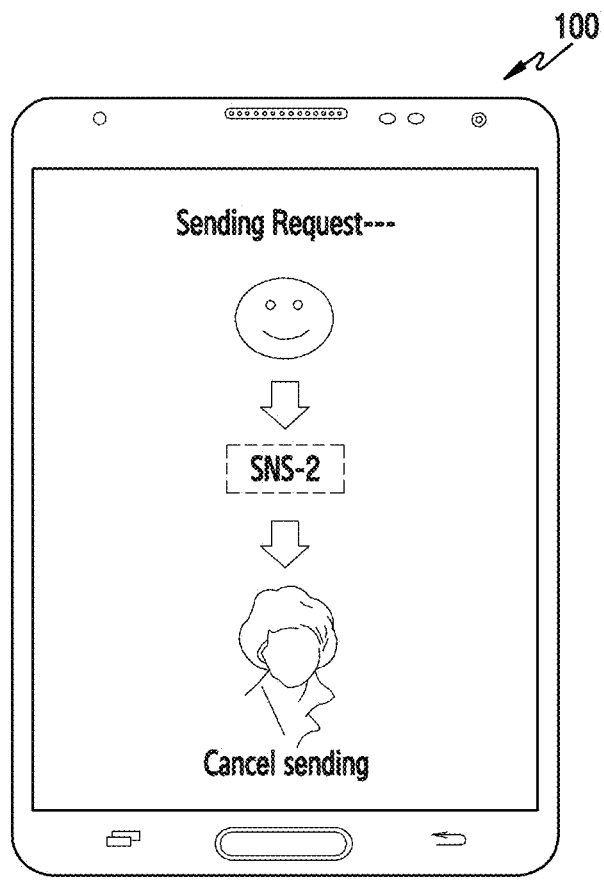
FIG. 13G shows an example illustration in which the connection request is sent based on an intensity level of the gesture.

The user intends to stop the motion of the "JOIN" gesture when the "intensity level 2" is displayed on the screen. Based on the intensity level mapping table (i.e., Table 14), the controller unit 104 maps the intensity level to the type of operation and determine at the "intensity level 2" is for "Sending the connection request to the friend over the SNS-2 as shown in the FIG. 13G. The FIG. 13G shows an example illustration in which the connection request is sent based on the intensity level of the gesture.

Figure 14:
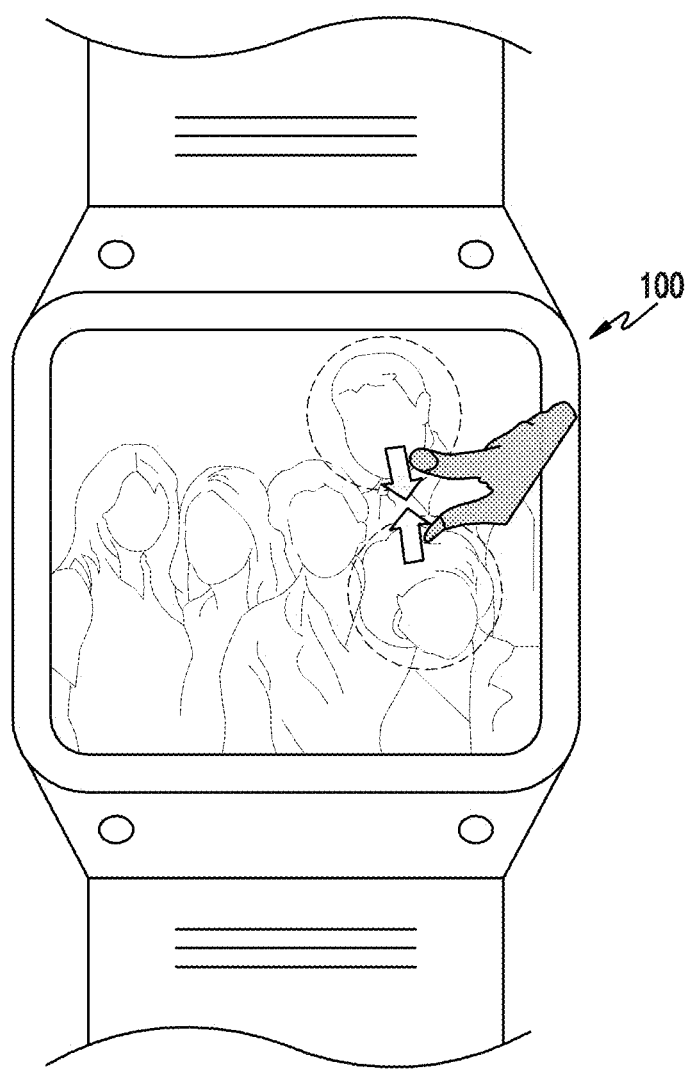
FIG. 14 shows an example illustration in which a gesture is performed on an image displayed on a screen of a wearable device, according to an embodiment as disclosed herein.

FIG. 14 shows an example illustration in which the gesture is performed on an image displayed on a screen of a wearable device, according to an embodiment as disclosed herein. The user can perform gesture over the image displayed on the screen of the wearable device (For example: Watch is depicted). The output of the gesture operation being displayed over the electronic device 100 (Ex. Television).

Figure 15:
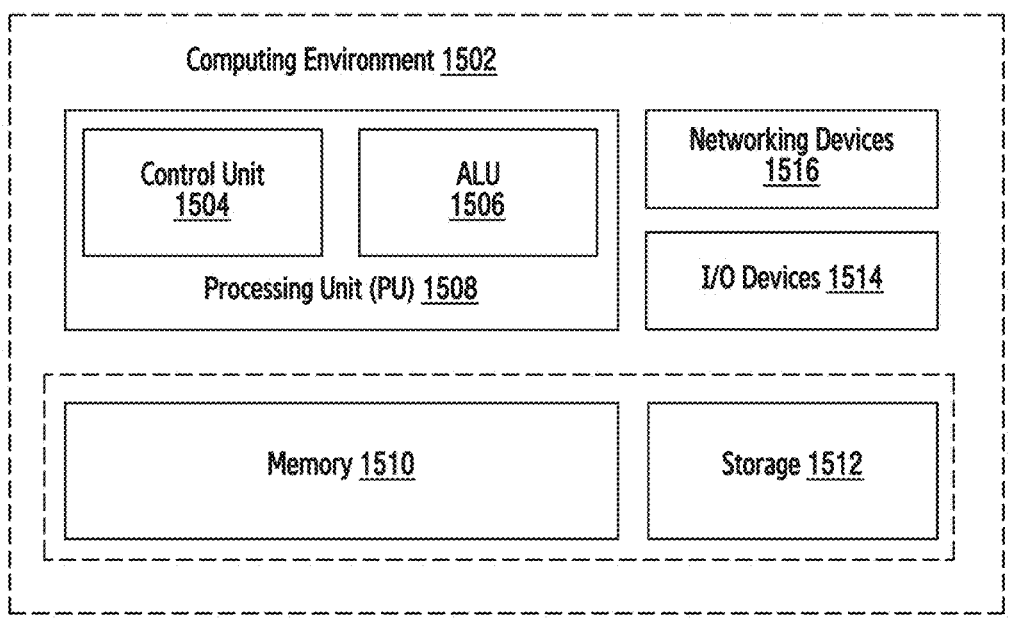
FIG. 15 illustrates a computing environment implementing the method for performing an operation based on gesture performed on at least two objects of interest, according to embodiments as disclosed herein.

FIG. 15 illustrates a computing environment implementing the method for performing an operation based on gesture performed on at least two objects of interest, according to embodiments as disclosed herein. As depicted in the figure, the computing environment 1502 comprises at least one processing unit 1508 that is equipped with a control unit 1504 and an Arithmetic Logic Unit (ALU) 1506, a memory 1510, a storage unit 1512, plurality of networking devices 1516 and a plurality Input output (I/O) devices 1514. The processing unit 1508 is responsible for processing the instructions of the technique. The processing unit 1508 receives commands from the control unit in order to perform its processing. Further, any logical and arithmetic operations involved in the execution of the instructions are computed with the help of the ALU 1506.

The overall computing environment 1502 can be composed of multiple homogeneous and/or heterogeneous cores, multiple CPUs of different kinds, special media and other accelerators. The processing unit 1508 is responsible for processing the instructions of the technique. Further, the plurality of processing units 1508 may be located on a single chip or over multiple chips.

The technique comprising of instructions and codes required for the implementation are stored in either the memory unit 1510 or the storage 1512 or both. At the time of execution, the instructions may be fetched from the corresponding memory 1510 or storage 1512, and executed by the processing unit 1508.

In case of any hardware implementations various networking devices 1516 or external I/O devices 1514 may be connected to the computing environment to support the implementation through the networking unit and the I/O device unit.

The embodiments disclosed herein can be implemented through at least one software program running on at least one hardware device and performing network management functions to control the elements. The elements shown in the FIGS. 1 through 15 include blocks which can be at least one of a hardware device, or a combination of hardware device and software module.

The foregoing description of the specific embodiments will so fully reveal the general nature of the embodiments herein that others can, by applying current knowledge, readily modify or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What is claimed is:

1. A method for operating an electronic device, the method comprising:
    displaying a plurality of objects in a first application;
    identifying a gesture having at least two touch points, and at least two objects on which the gesture is performed among the plurality of objects;
    identifying a level of the gesture among a plurality of levels based on a distance between the at least two touch points by the gesture and a movement speed of each of the at least two touch points by the gesture;
    displaying an indicator comprising a numeral changed based on the identified level of the gesture to indicate a type of at least one operation to be performed on the at least two objects;
    determining the type of the at least one operation corresponding to the identified level of the gesture among a plurality of types for operations, based on mapping information between the plurality of levels and the plurality of types for the operations; and
    performing the at least one operation for the determined type corresponding to the identified level of the gesture in a second application which is capable of the operations,
    wherein the performing the at least one operation comprises displaying at least one content in the second application, and
    wherein the displayed at least one content represents at least part of the at least one operation for the determined type corresponding to the identified level of the gesture.

2. The method of claim 1,
    wherein the indicator further comprises at least one of an application icon, a symbol, or a character.

3. The method of claim 1,
    wherein the identifying of the level of the gesture comprises determining a type of the gesture, and
    wherein the determining of the type of at least one operation comprises referring the mapping information according to the type of the gesture.

4. The method of claim 3, wherein the type of the gesture includes one of join or away.

5. The method of claim 1, wherein a functionality provided by the second application comprises at least one of:
    pairing the at least two objects,
    sending a friend request in a Social Networking Site (SNS) relative to the at least two objects,
    sending recommendation in a SNS relative to the at least two objects,
    scheduling a meeting relative to the at least two objects,
    initiating a call relative to the at least two objects,
    requesting a service relative to the at least two objects,
    modifying playback option relative to the at least two objects,
    or
    displaying historic data relative to the at least two objects.

6. The method of claim 1, further comprising:
    displaying information of the at least one operation for the determined type.

7. The method of claim 1, further comprising:
    detecting an input for an item displayed for indicating the second application;
    identifying at least one parameter associated with the item for indicating the second application; and
    identifying the operations associated with a functionality provided by the second application based on the identified at least one parameter.

8. The method of claim 7,
    wherein the detecting the input for the item for indicating the second application comprises detecting an input for a clipart object in an image comprising the plurality of objects, and
    wherein the method further comprises displaying an indication for providing an option to proceed to determine the type of the at least one operation among the identified operations associated with the functionality provided by the second application.

9. The method of claim 1, further comprising:
determining a feedback based on the level of the gesture after identifying the level of the gesture,
wherein the feedback is more strongly determined as the level of the gesture is higher.

10. The method of claim 1,
wherein the displaying the plurality of objects in the first application comprises displaying the plurality of objects for indicating a plurality of electronic devices that are proximate to the electronic device in an application for a bluetooth pairing,
wherein the at least two objects comprise a first object for indicating the electronic device and a second object for indicating another electronic device, and
wherein the plurality of types for the operations are determined according to combinations of permission configurations for the bluetooth pairing.

11. An electronic device comprising:
a display configured to display a plurality of objects in a first application; and
at least one processor configured to:
identify a gesture having at least two touch points, and at least two objects on which the gesture is performed among the plurality of objects;
identify a level of the gesture among a plurality of levels based on a distance between the at least two touch points by the gesture and a movement speed of each of the at least two touch points by the gesture;
display an indicator comprising a numeral changed based on the identified level of the gesture to indicate a type of at least one operation to be performed on the at least two objects;
determine the type of the at least one operation corresponding to the identified level of the gesture among a plurality of types for operations, based on mapping information between the plurality of levels and the plurality of types for the operations; and
perform the at least one operation for the determined type corresponding to the identified level of the gesture in a second application which is capable of the at least one operation,
wherein, to perform the at least one operation, the at least one processor is further configured to control the display to display at least one content, the at least one content representing at least part of the at least one operation for the determined type corresponding to the identified level of the gesture.

12. The electronic device of claim 11,
wherein the indicator further comprises at least one of an application icon, a symbol, or a character.

13. The electronic device of claim 11,
wherein, to identify the level of the gesture, the at least one processor is further configured to determine a type of the gesture, and
wherein, to determine the type of the gesture, the at least one processor is further configured to refer the mapping information according to the type of the gesture.

14. The electronic device of claim 13, wherein the type of the gesture includes one of join or away.

15. The electronic device of claim 11, wherein a functionality provided by the second application comprises at least one of:
pairing the at least two objects,
sending a friend request in a Social Networking Site (SNS) relative to the at least two objects,
sending recommendation in a SNS relative to the at least two objects,
scheduling a meeting relative to the at least two objects,
initiating a call relative to the at least two objects,
requesting a service relative to the at least two objects,
modifying playback option relative to the at least two objects,
or
displaying historic data relative to the at least two objects.

16. The electronic device of claim 11, wherein the display is further configured to display information of the at least one operation for the determined type.

17. The electronic device of claim 11, wherein the at least one processor is further configured to:
detect an input for an item displayed for indicating the second application,
identify at least one parameter associated with the item for indicating the second application, and
identify the operations associated with a functionality provided by the second application based on the identified at least one parameter.

18. The method of claim 17,
wherein, in order to detect the input for the item for indicating the second application, the at least one processor is further configured to detect an input for a clipart object in an image comprising the plurality of objects, and
wherein the display is further configured to display an indication for providing an option to proceed to determine the type of the at least one operation among the identified operations associated with the functionality provided by the second application.

19. The electronic device of claim 11, wherein the at least one processor further configured to:
determine a feedback based on the level of the gesture after identifying the level of the gesture,
wherein the feedback is more strongly determined as the level of the gesture is higher.

20. The electronic device of claim 11,
wherein, in order to display the plurality of objects in the first application, the display is further configured to display the plurality of objects for indicating a plurality of electronic devices that are proximate to the electronic device in an application for a bluetooth pairing,
wherein the at least two objects comprise a first object for indicating the electronic device and a second object for indicating another electronic device, and
wherein the plurality of types for the operations are determined according to combinations of permission configurations for the bluetooth pairing.

* * * * *